United States Patent [19]

Fujii

[11] Patent Number: 5,299,207
[45] Date of Patent: Mar. 29, 1994

[54] CENTRALIZED SUPERVISORY SYSTEM FOR TRANSMISSION NETWORK ELEMENTS AND METHOD OF SUPERVISING TRANSMISSION NETWORK ELEMENTS

[75] Inventor: Yasuo Fujii, Kawasaki, Japan

[73] Assignee: Fujitsu Limited, Kawasaki, Japan

[21] Appl. No.: 850,490

[22] Filed: Mar. 12, 1992

[30] Foreign Application Priority Data

Mar. 15, 1991 [JP] Japan .................................. 3-049993
Mar. 15, 1991 [JP] Japan .................................. 3-049994

[51] Int. Cl.⁵ .......................................... G06F 15/16
[52] U.S. Cl. .................................... 371/29.1; 395/575
[58] Field of Search ....................... 371/29.1; 395/575; 364/221.6, 221.7, 229.3, 230

[56] References Cited

U.S. PATENT DOCUMENTS 4,982,400  1/1991  Ebersole ........................... 370/85.15
5,041,963  8/1991  Ebersole et al. ...................... 364/200

Primary Examiner—Vincent P. Canney
Attorney, Agent, or Firm—Staas & Halsey

[57] ABSTRACT

A large-scale centralized supervisory system for a plurality of network elements comprises a plurality of system zones. Each system zone has a plurality of supervisors connected to the transmission network elements, for supervising respective statuses of the network elements, a central supervisor for managing the network elements based on supervisory data transmitted from the supervisors, and an extensive supervisor connected between the supervisors and the central supervisor, for collecting the supervisory data from the supervisors and transmitting the collected supervisory data to the central supervisor and also to the extensive supervisor of an adjacent one of the other system zones. The supervisors collect current data indicating current statuses of the network elements, event data indicating changes in the current statuses of the network elements, and historical data indicating statuses of the network elements before the central supervisor is set up, and transmit the collected data to the central supervisor. The central supervisor generates a current table of the statuses of the network elements based on the transmitted data, displays data of the current table on the display unit, and generates history data including fault histories of the network elements for managing fault data of the network elements.

13 Claims, 23 Drawing Sheets

PRIOR ART

Fig. 11(a) SEQUENCE TABLE BEFORE UPDATE

| OR-DER | TABLE VALUE |
|---|---|
| 1 | C1 |
| 2 | C2 |
| 3 | C3 |
| 4 | C4 |

Fig. 11(b) SEQUENCE TABLE AFTER UPDATE

| OR-DER | TABLE VALUE |
|---|---|
| 1 | C2 |
| 2 | C3 |
| 3 | C4 |
| 4 | |

| |
|---|
| ATTRIBUTE OF FAULT |
| NAME OF FAULT |
| NAME OF TRANSMISSION NETWORK ELEMENT SUFFERING FAULT |
| PLACE OF TRANSMISSION NETWORK ELEMENT SUFFERING FAULT |
| ADDRESS OF TRANSMISSION NETWORK ELEMENT SUFFERING FAULT |
| TIME OF OCCURRENCE OF FAULT |
| TIME OF RESTORATION FROM FAULT |
| PERIOD FOR WHICH FAULT CONTINUED |

Fig. 20

CENTRALIZED SUPERVISORY SYSTEM FOR TRANSMISSION NETWORK ELEMENTS AND METHOD OF SUPERVISING TRANSMISSION NETWORK ELEMENTS

BACKGROUND OF THE INVENTION

1. Field of the Invention

The present invention relates to a centralized supervisory system for supervising transmission network elements and a method of supervising transmission network elements, and more particularly to a system for and a method of centralized supervision of a transmission network with sets of supervisors (SVs) and a plurality of supervisors in each set for supervising a number of transmission network elements and a central supervisor (CSV) connected to the supervisors.

2. Description of the Prior Art

There is generally known a centralized supervisory system having a plurality of supervisors (SVs) for supervising respective transmission network elements scattered in remote locations and connected respectively to the supervisors, and a central supervisor (CSV) for collecting supervisory data from the supervisors and processing the supervisory data for efficient network maintenance. The central supervisor usually comprises a minicomputer or a workstation for achieving high-level processing operation.

The minicomputer or workstation has a highly sophisticated human interface device which can display more specific supervisory data including the type of a fault that has occurred, a network element that is subjected to a fault, and a network region or zone in which a fault has occurred, than conventional LED devices. The minicomputer or work station also makes it possible to manage supervisory data as by statistically processing supervisory data. For such supervisory data management, it is necessary to obtain history data that are higher in level than conventional fault data called a "log".

One conventional centralized supervisory system is shown in FIG. 1 of the accompanying drawings. The conventional centralized supervisory system comprises a tree-type hierarchical network having a number of slave supervisors (SSVs) connected respectively to transmission network elements (NEs), a number of master supervisors (MSVs) each connected to some of the slave supervisors, and a central supervisor (CSV) positioned at the top of the tree structure and connected to the master supervisors (MSVs). Information as to a fault that has taken place in any transmission network element (NE) is sent successively through the corresponding slave supervisor (SSV) and the corresponding master supervisor (MSV) to the central supervisor (CSV). Each of the transmission network elements (NEs) has a built-in processor for diagnosing itself for a fault, and transmits diagnostic data through a built-in supervisor to the corresponding slave supervisor (SSV). The slave supervisors (SSVs) and the master supervisors (MSVs) collect and transmit the diagnostic data to the central supervisor (CSV). The slave supervisors (SSVs) and the master supervisors (MSVs) primarily serve to collect and transmit data though they slightly process the collected data. The central supervisor (CSV) supervises the transmitted fault data and manages the entire system.

In recent years, the supervisory area of a central supervisory system has been spreading from local urban regions to a national stage. The widespread supervisory service has resulted in many supervisory bases or footings and a hierarchical centralized supervisory system configuration, and demands a plurality of centralized supervisory systems put together for higher reliability.

To meet such a demand, there has been proposed a larger-scale centralized supervisory system having two tree configurations as shown in FIG. 2 of the accompanying drawings. In the illustrated centralized supervisory system, fault data is transmitted from a slave supervisor (SSV) through a master supervisor (MSV) to an extensive supervisor (XSV), from which the fault data is supplied to a zone center (ZC) and a national center (NC). The zone center (ZC) effects centralized supervision of those transmission network elements that are disposed in a zone to which the zone center (ZC) belongs. The national center (NC) supervises all the transmission network elements across the zones.

The conventional centralized supervisory system is, however, disadvantageous for the following reasons:

1. Fault data and other data in each zone are supplied to the national center (NC), but not to the other zones. Therefore, in the event of a fault with a transmission network element in one zone adversely affecting lines connecting the fault network element to the transmission network elements in other zones, those zone centers (ZC) of the zones that are connected to the adversely affected lines can recognize the malfunctioning of the lines, but cannot identify the position of the fault and hence cannot take an appropriate action.

2. When the national center (NC) malfunctions due to a fault, the zones are detached from each other, and the zone centers (ZC) effect centralized supervision of their own zones, respectively. Consequently, the ability of the system to supervise the transmission network elements all across the zones is disabled.

3. The number of zones that can be supervised by the national center (NC) depends on the number of input ports possessed by the national center (NC). Therefore, the number of zones that can be added is limited, and the entire system cannot be expanded beyond a certain limit.

The central supervisor (CSV) and the transmission network elements (NEs) supervised thereby are connected by dedicated communication lines, over which fault data are transmitted from the transmission network elements (NEs) to the central supervisor (CSV). The fault data include current data indicative of the current status of the transmission network elements (NEs), and event data indicative of only a change in the current status after the previous status has been transmitted from the transmission network elements (NEs) to the central supervisor (CSV). The central supervisor (CSV) receives the fault data as a communication message, and collects and manages the received fault data.

For the sake of brevity, the flow of such a communication message will be described below as a flow from an XSV to a CSV which may be an NC or a ZC. Specifically, the XSV collects communication messages from NEs through SSVs and MSVs, and then sends the collected communication messages to the CSV. Here, the transmission of a communication message from the XSV to the CSV will be described by way of example. The flow of a communication message between the NEs, the SSVs, the MSVs, and the XSV will not be described below unless particularly necessary.

For collecting fault data by way of the flow of a communication message from the XSV to the CSV, the following three alternative time sequences may occur when the XSV and the CSV are started:

1. The XSV side is set up first, and thereafter the CSV side is set up.
2. The CSV side is set up first, and thereafter the XSV side is set up.
3. The CSV side is set up first, then the XSV side is set up, thereafter disabled, and then set up again.

The flow of fault data between the XSV and the CSV will be described below with respect to the above three time sequences. The time when the XSV side and the CSV side are set up is the time when they are energized with electric power supplied thereto, and the setting-up is completed upon elapse of an idle time (setting-up time) in which data loading, initialization, transmission of a request for current data, and reception of transmitted data are carried out. When the setting-up is completed, the XSV and the CSV are ready to supervise the NEs. The setting-up of the XSV side includes the setting-up of the XSV, the SSVs, the MSVs, and the NEs.

FIG. 3 of the accompanying drawings is a timing chart of the first time sequence referred to above in which the CSV side is set up subsequently. A CSV 70 has a current table 74 indicative of the contents of faults at times, and history data 75 indicative of the histories of the respective faults. In reality, there are several thousand to several ten thousand NEs, and hence there are a considerable number of contents of faults and the history data 75 are composed of a large number of fault data. However, it is assumed for simplicity that there are three faults A, B, C and there are fault data with respect to the faults A, B, C.

As shown in FIG. 3, the XSV 60 side is set up, subjected to a fault A at a time t0, then restored from the fault A at a time t1, and subjected again to a fault B at a time t2. During this time, the CSV 70 side has not been set up, and fault data from the SSVs and the MSVs are stored in a buffer memory of the XSV 60.

Then, when the CSV 70 side is set up, the CSV 70 clears all the contents of the current table 74, writes "RESTORED" in the current table 74, and issues a request command to request current data from the XSV 60. In response to the request command, the XSV 60 sends current data 81 representing current data (B occurred, restored from A, C at t2) to the CSV 70. Based on the supplied current data 81, the CSV 70 produces a current table 74 and also history data 84 with respect to the fault B. Then, the XSV 60 transmits stored event data 82 to the CSV 70. Based on the transmitted event data 82, the CSV 70 generates data indicating occurrence of and restoration from of the fault A, and also data indicating occurrence of the fault B, in the current table 74. The occurrence of and restoration from the fault A are indicated within a rectangular frame 83 in the current table 74. Then, the CSV 70 generates, as the history data 75, history data 85 corresponding to the occurrence of and restoration from the fault A and history data 86 corresponding to the occurrence of the fault B.

One problem with the above first time sequence is that the two history data 84, 86 are generated with respect to the fault B. Another problem is that the setting-up of the CSV 70 is delayed while the current table 74 is being updated with the occurrence of and restoration from the fault A, and since there are many NEs actually, large event data are stored in the buffer, and the idle time (setting-up time) of the CSV 70 side is considerably long.

FIG. 4 of the accompanying drawings is a timing chart of the second time sequence referred to above in which the XSV side 60 is set up after the CSV 70 side.

As shown in FIG. 4, the CSV 70 side is set up, clears all the contents of the current table 74, i.e., writes "RESTORED", then waits for a circuit link to be connected to the XSV 60 side. Then, the XSV 60 side is set up, and faults A, B occur at a time t0. The CSV 70 side issues a request command for requesting current data from the XSV 60. In response to the request command, the XCV 60 sends current data 91 representing current data (A, B occurred, restored from C at t0) to the CSV 70. Based on the supplied current data 91, the CSV 70 produces a current table 74 and also history data 93, 94 with respect to the faults A, B. When restored from the fault A at a time t1, the XSV 60 sends event data 92 indicative of the restoration from the fault A to the CSV 70. Based on the event data 92, the CSV 70 writes "RESTORED" in the item A in the current table 74, and also writes "t1" in the restoration time of the history data 93.

As described above, when the CSV 70 side is set up, the CSV 70 clears all the contents of the current table 74 and write "RESTORED" in the current table 74. Actually, at this time, the XSV 60 has not been set up yet, and the statuses of the respective NEs are not fixed while no link is being established between the NEs and the XSV 60. Accordingly, the display of "RESTORED" on the display unit of the CSV 70 side does not properly reflect the actual statuses of the NEs. Particularly, if an actual NE corresponding to an NE registered in a data base of the CSV 70 is not operable (i.e., if a board with the NE mounted thereon is removed from the terminal station), then even after the communication link has been established, the CSV 70 is not informed of the inability of the NE to operate and interprets the NE as being normally operable.

FIG. 5 of the accompanying drawings is a timing chart of the third time sequence referred to above in which after the CSV 70 side is set up, the XSV 60 side that has once been set up is disabled and then set up again.

As shown in FIG. 5, the CSV 70 side is set up, then the XSV 60 is set up, and the CSV 70 side generates a current table 74 and also history data 103, 104 based on current data 101. Then, the XSV 60 side is disabled and set up again. At this time, the XSV 60 sends current data 102 (A, B occurred, restored from C at t1) to the CSV 70. The CSV 70 generates history data 105, 106 again based on the current data 102.

As described above, the history data 105, 106 are generated again and exist together with the history data 103, 104. To avoid the overlapping history data, it might be possible to search and check all the history data 75 for identical fault data. Since the history data 75 are actually considerably large, however, it would take a long period of time to check the history data 75 with respect to all the current data. Therefore, such a process would not be practically feasible.

As described above, the time sequences shown in FIGS. 3, 4, and 5 have problems with respect to the conventional centralized supervisory system.

As described with reference to FIG. 3, when the CSV 70 side is set up, the XSV 60 sends the event data 82 stored in the buffer memory of the XSV 60 to the CSV 70. Since the current table 74 is updated each time the event data 82 are sent to the CSV 70, the contents of the current table 74 change in order to process the past fault data that are not necessary in the present supervisory process, and the display unit of the CSV 70 side displays the past faults as they vary. Furthermore, a long period of time is required to process a large number of data from the NEs that are stored in the buffer memory. Therefore, it takes a long time until the CSV 70 side starts a supervisory process, i.e., the idle time (setting-up time) of the CSV 70 side is long.

According to another problem, as shown in FIG. 3, since the current data 81 and the stored event data 82 are transmitted, the data about the same fault B are generated as the history data 84, 86 in the history data 75.

As described with reference to FIG. 4, when the CSV 70 side is set up, the contents of the current table 74 are cleared to "RESTORED". However, the statuses of the respective NEs are not fixed before the XSV 60 side is set up and no link is established between the NEs and the XSV 60. Therefore, displaying the "RESTORED" on the display unit of the CSV 70 side does not reflect the actual NE statuses. Particularly, if an NE registered in the data base of the CSV 70 is not actually operable (i.e., if the board with the NE mounted thereon is removed), then even after the communication link has been established, the CSV 70 is not informed of the inability of the NE to operate and interprets the NE as being restored or normally operable.

As described above with reference to FIG. 5, history data are generated again together with existing history data. This drawback could be avoided by searching and checking all the history data 75 for identical or overlapping data. Since the history data 75 are considerably large, however, the time required to search all the history data 75 would be so long that such a process would not be practical.

SUMMARY OF THE INVENTION

It is an object of the present invention to provide a system for centralized supervision of a transmission network, which is suitable for use in a large-scale central supervisory system, and a method of centralized supervision of a transmission network using such a centralized supervisory system.

Another object of the present invention is to provide a system for centralized supervision of a transmission network, which is capable of efficiently processing supervisory data, and a method of centralized supervision of a transmission network using such a centralized supervisory system.

Still another object of the present invention is to provide a system for centralized supervision of a transmission network, which can be set up in a short period of time, and a method of centralized supervision of a transmission network using such a centralized supervisory system.

Yet another object of the present invention is to provide a system for centralized supervision of a transmission network, which is capable of accurately recognizing the occurrence of and restoration from faults of transmission network elements when the centralized supervisory system is set up, and a method of centralized supervision of a transmission network using such a centralized supervisory system.

A further object of the present invention is to provide a system for centralized supervision of a transmission network, which does not display the occurrence of and restoration from past faults of transmission network elements, and a method of centralized supervision of a transmission network using such a centralized supervisory system.

A still further object of the present invention is to provide a system for centralized supervision of a transmission network, which does not produce overlapping identical history data.

According to the present invention, there is provided a system for centralized supervision of a plurality of interconnected transmission network elements, comprising a plurality of system zones each comprising a plurality of supervisors adapted to be connected respectively to the transmission network elements, for supervising respective statuses of the transmission network elements, a central supervisor for managing the transmission network elements based on supervisory data transmitted from the supervisors, respectively, and an extensive supervisor connected between the supervisors and the central supervisor, for collecting the supervisory data from the supervisors and transmitting the collected supervisory data to the central supervisor and also to the extensive supervisor of an adjacent one of the other system zones.

According to the present invention, there is also provided a method of supervising a plurality of transmission network elements with a centralized supervisory system comprising a plurality of supervisors for supervising the transmission network elements, respectively, and a central supervisor for supervising the supervisors, the central supervisor having a display unit, the method comprising the steps of collecting, with the supervisors, current data indicative of current statuses of the transmission network elements, event data indicative of changes in the current statuses of the transmission network elements, and historical data indicative of statuses of the transmission network elements before the central supervisor is set up, transmitting the collected current data, event data, and historical data from the supervisors to the central supervisor, generating, with the central supervisor, a current table indicative of the statuses of the transmission network elements based on the transmitted current data, event data, and history data, displaying data of the current table on the display unit, and generating, with the central supervisor, history data including fault histories of the transmission network elements for managing fault data of the transmission network elements.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 11(a) is a diagram of a sequence table before it is updated;

FIG. 11(b) is a diagram of a sequence table after it is updated;

FIG. 20 is a diagram showing a structure of history data;

DETAILED DESCRIPTION OF THE PREFERRED EMBODIMENT

Figure 6:
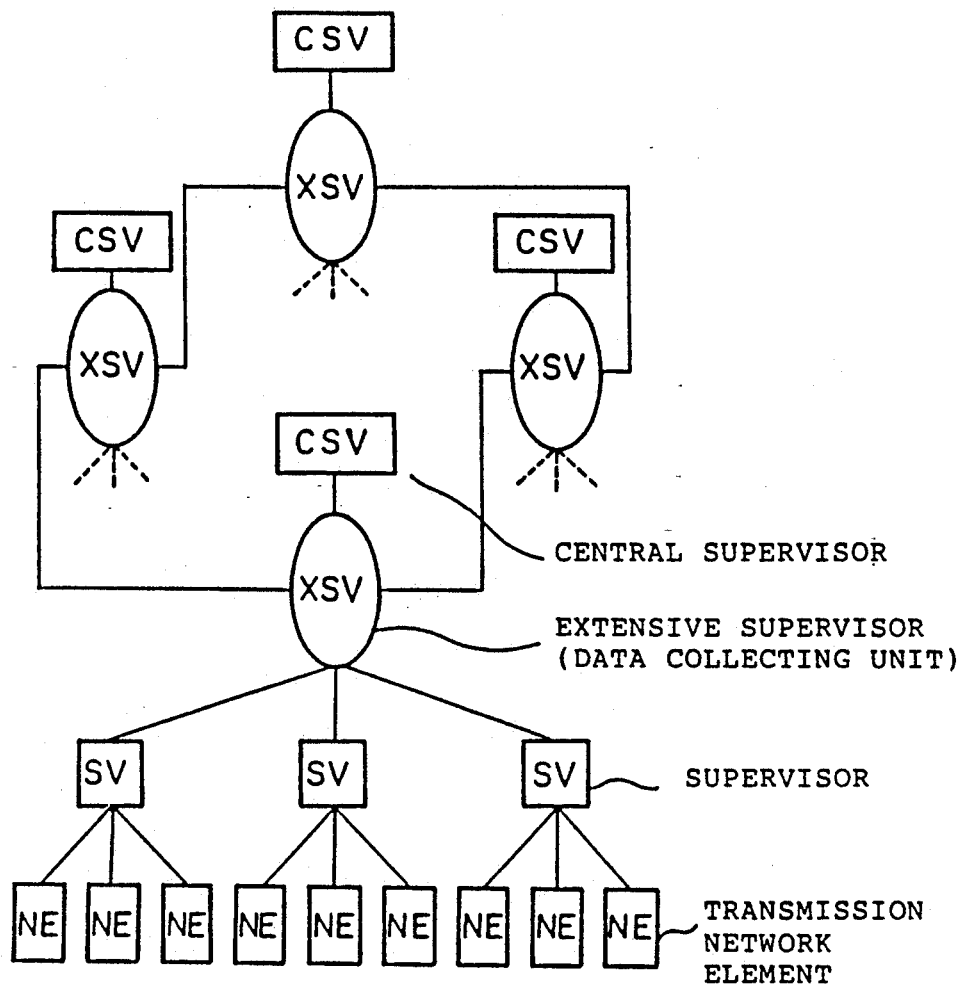
FIG. 6 is a block diagram of a centralized supervisory system associated with a transmission network, according to the present invention.

FIG. 6 is a block diagram of a centralized supervisory system combined with a transmission network. The transmission network has a number of transmission network elements NE that are interconnected for transmitting information therebetween. The centralized supervisory system is composed of a plurality of system divisions or zones each comprising a plurality of supervisors SV each connected to a group of transmission network elements NE for supervising the transmission network elements NE, and a central supervisor CSV connected to the supervisors SV for supervising supervisory data of the supervisors SV.

The system zones further include respective extensive supervisors or data collecting units XSV for collecting the supervisory data from the supervisors SV. Each of the extensive supervisors XSV transmits the collected supervisory data to the extensive supervisors XSV of the other system zones. The extensive supervisors XSV are connected in a ring-shaped network.

One of the central supervisors CSV is selected to supervise the supervisory data from all the supervisors SV. In the event of a fault of the selected central supervisor CSV, another central supervisor CSV is selected to supervise the supervisory data from all the supervisors SV.

In each of the system zones, supervisory data relative to the respective transmission network elements NE are transmitted through the respective supervisors SV to the extensive supervisor XSV, from which the supervisory data are transmitted to the central supervisor CSV and also to the central supervisors CSV of the other system zones. The central supervisor CSV operates as a front-end machine for simply managing, processing, and displaying the supervisory data collected by the extensive supervisor XSV. The function to collect supervisory data is distributed to the extensive supervisors XSV of the system zones. This function distribution makes it possible to provide a large-scale centralized supervisory system for a communication network.

The ring-shaped network of the extensive supervisors XSV of the system zones allows each of the extensive supervisors XSV to transmit collected fault data of any of the transmission network elements NE to the other extensive supervisors XSV or to receive such fault data from the other extensive supervisors XSV. The ring-shaped network of the extensive supervisors XSV serves as a low-speed, wide-area network that permits any one of the central supervisors CSV to recognize the supervisory data of the other system zones.

One of the central supervisors CSV is selected to supervise the supervisory data from all the supervisors SV. Therefore, extensive supervisors XSV and central supervisors CSV can be added to the ring-shaped system network irrespective of the number of input pots of the selected central supervisor CSV.

In the event of a fault of the selected central supervisor CSV, another central supervisor CSV is selected to supervise the supervisory data from all the supervisors SV. Therefore, any fault of the selected central supervisor CSV does not impair the supervising capability of the central supervisory system.

Details of the centralized supervisory system according to the present invention will be described below.

Figure 7:
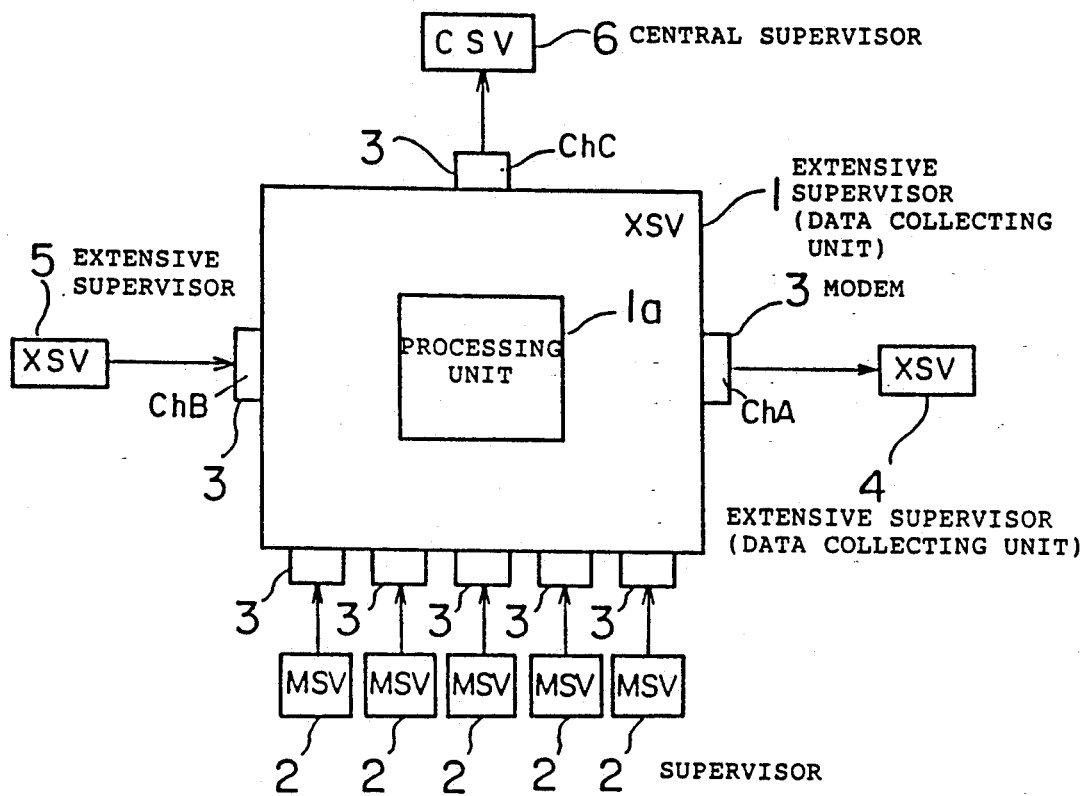
FIG. 7 is a block diagram of an extensive supervisor or data collecting unit (XSV)

FIG. 7 is a block diagram of an extensive supervisor or data collecting unit XSV belonging to one system zone and other components connected thereto. The extensive supervisor (hereinafter referred to as "XSV"), denoted at 1, has a processing unit 1a therein for collecting, processing, and transmitting data. The system zone to which the XSV 1 belongs has a plurality of master supervisors (hereinafter referred to as "MSV") 2 connected through respective modems 3 as communication ports to the XSV 1. To each of the MSVs 2, there are connected a plurality of slave supervisors SSV (not shown) each connected to a plurality of transmission network elements NE (not shown in FIG. 7) that are supervised by the slave supervisors SSV.

The XSV 1 has three additional communication ports ChA, ChB, ChC. The communication port ChA serves to transmit data to an XSV 4 in another system zone (first system zone). The communication port ChB serves to receive data from an XSV 5 in still another system zone (second system zone). The communication port ChC serves to transmit data to a central supervisor (hereinafter referred to as "CSV") 6 of the system zone to which the XSV 1 belongs. The communication ports ChA, ChB, ChC comprise modems, respectively, and are connected to the XSV 4, the XSV 5, and the CSV 6, respectively, according to the HDLC (High Level Data Link Control Procedure). Normally, the communication ports ChA, ChB, ChC check line connections by way of transmission and reception of RR upon connection polling.

Figure 8:
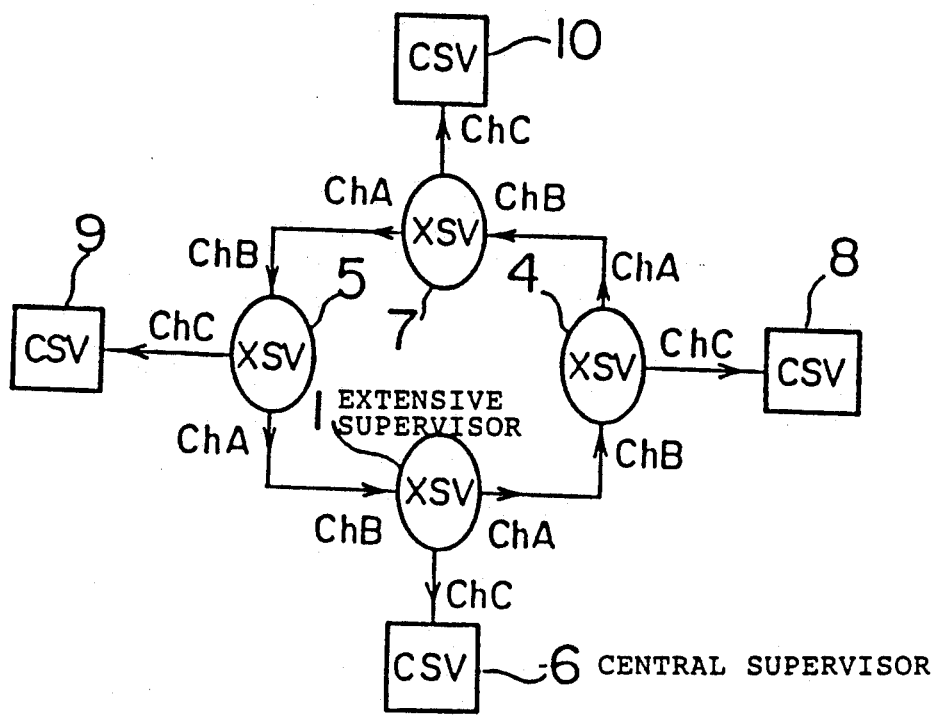
FIG. 8 is a block diagram of a ring-shaped network of extensive supervisors.

As shown in FIG. 8, the XSV 1, the XSV 4, the XSV 5, and another XSV 7 are connected in a ring-shaped network. The XSVs 4, 5, 7 are associated with respective CSVs 8, 9, 10 in respective pairs. Each of the pairs of these XSVs 4, 5, 7 and the CSVs 8, 9, 10 has an arrangement identical to the arrangement of the XSV 1 and the CSV 6 shown in FIG. 7. While the four pairs of XSVs and CSVs are shown as being connected in a ring-shaped network in FIG. 8, any number of pairs of XSVs and CSVs may be connected in a ring-shaped network.

Each of the pairs of XSVs and CSVs are positioned in a location widely spaced from the other pairs. The pairs of XSVs and CSVs cannot be connected to each other by a usual dedicated local area network (LAN), but are connected to each other by dedicated circuit lines of a public communication network. Using such a public communication network, the XSVs are interconnected by a unidirectional communication path in the ring-shaped network. Data communication between the XSVs may be carried out according to a general communication protocol such as HDLC, and does not require dedicated hardware and protocol.

Transmission and reception of data by the processing unit 1a in the XSV 1 will be described below with reference to FIG. 7.

The processing unit 1a applies the address of its own station (XSV 1) to data received from each of the MSVs 2, and transmits the data through the port ChA to the XSV 4 and also through the port ChB to the CSV 6.

The processing unit 1a receives data from the XSV 5 through the port ChB. If the address applied to the received data is the same as the address of its own station, the processing unit 1a discards the received data. The received data with the same address is discarded because it has been transmitted from the XSV 1 and returned through the ring-shaped network, and has already been transmitted to the CSV 6.

If the address applied to the received data is different from the address of its own station, the processing unit 1a transmits the received data and its address through the ports ChA, ChB to the XSV 4 and the CSV 6.

Therefore, each of the CSVs can recognize the data from all the system zones that are connected by the ring-shaped network.

When each of the XSVs is set up, a national center (described later on) transmits a request for current data to all of the XSVs. After having been set up, each of the XSVs transmits fault data with its own address to the national center. Until the setting up of an adjacent XSV is completed, each XSV stores data to be transmitted to the adjacent XSV in its own buffer memory. The XSV transmits the stored data to the adjacent XSV when the adjacent XSV is fully set up.

Operation of the CSVs in the pairs connected in the ring-shaped network will be described below.

One of the CSVs is selected according to a procedure described later on, and operates as a central supervisor, or a national center, across all the system zones. The national center serves to supervise all the data received from the XSVs. Each of the other CSVs that have not been selected serve as a zone center to supervise the data received from the XSV belonging to its own system zone. Specifically, each of the unselected CSVs compares an address held thereby (identical to the address of the XSV with which it is paired) with the address of the received data, and supervises the received data only when the compared addresses agree with each other.

Each of the XSVs supervises its own ports ChA, ChB, ChC with the RR that is a command/response in a supervisory format of the HDLC, so that the XSV can check the other XSVs and the CSV for line conditions such as line breakage and statuses such as faults of processing units thereof. In the event of a fault of communication with the national center CSV or between the national center CSV and its corresponding XSV, the XSV issues an internal communication message and transmits the communication message onto the network to replace the national center CSV with another normal CSV for continued centralized supervision of the entire system.

Figure 9:
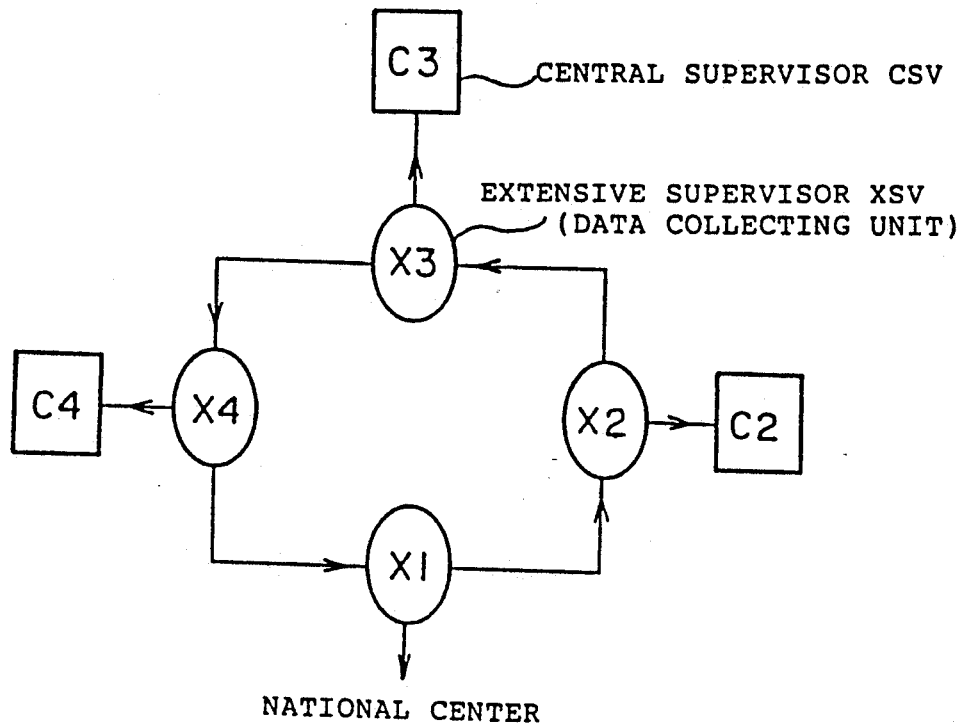
FIG. 9 is a block diagram of a ring-shaped network, illustrative of a processing operation at the time of a fault of a national center.

Replacement of the national center CSV in the event of a fault will be described below with reference to FIG. 9. FIG. 9 shows a ring-shaped network identical to that shown in FIG. 8. For the sake of brevity, the XSV 1, the XSV 4, the XSV 7, the XSV 5, the CSV 6, the CSV 8, the CSV 10, and the CSV 9 shown in FIG. 8 are referred to as X1, X2, X3, X4, C1, C2, C3, C4, respectively, in FIG. 9.

If a fault occurs to the C1 which is a national center, the X1 detects the fault as it receives no response RR from the C1. The X1 issues a communication message indicative of the fault, with its own station address applied, and transmits the communication message successively to the X2, X3, X4. The C2, C3, C4 now recognize that the national center is subjected to a fault, and immediately update sequence tables held respectively thereby. The sequence tables carry data that determines a sequence by which the central supervisors C1, C2, C3, C4 serve as the national center.

After the sequence table has been updated, a central supervisor CSV which is newly positioned in the first position of the sequence table starts to function as the national center to supervise all the system zones.

Figure 10:
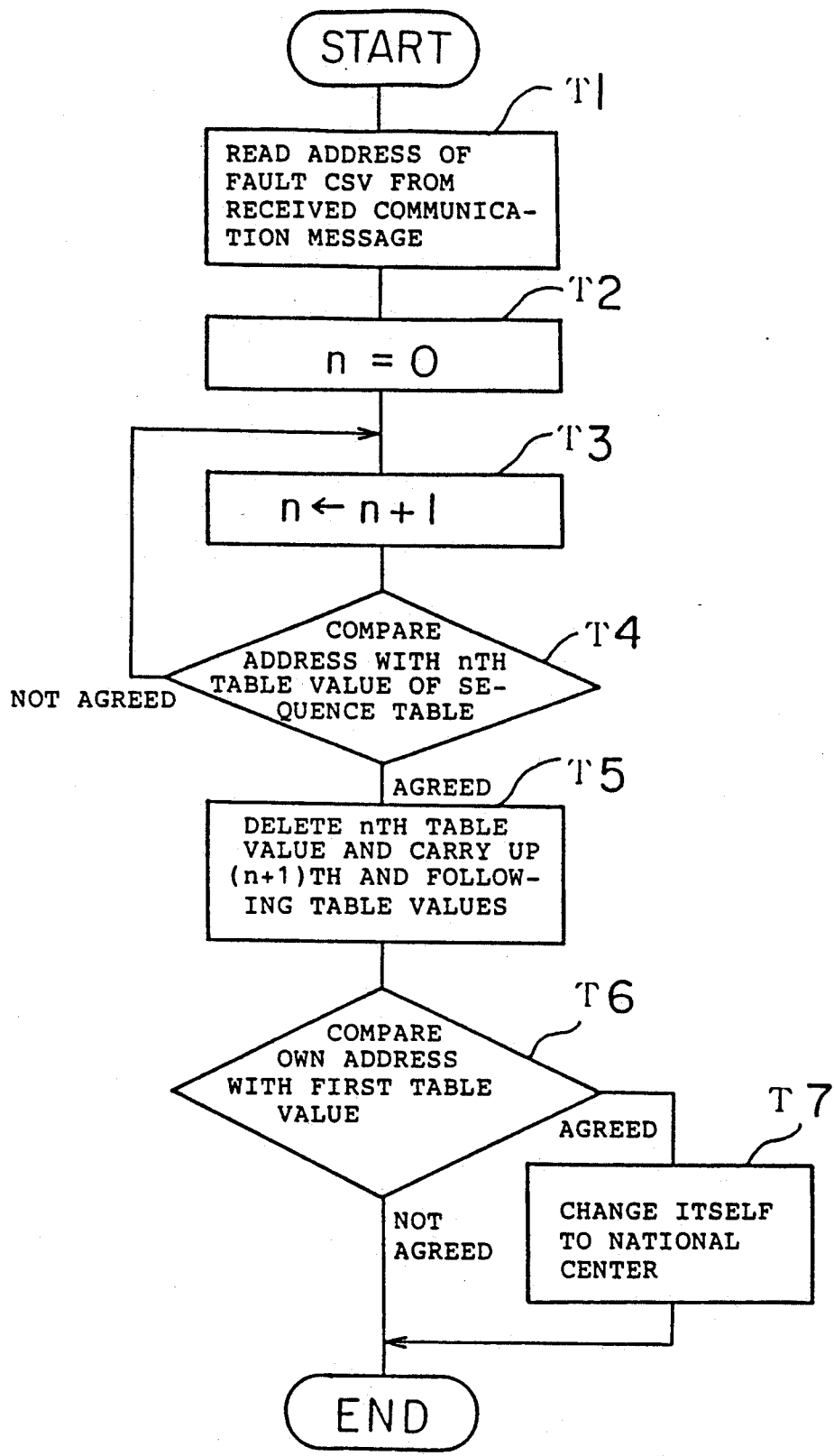
FIG. 10 is a flowchart of a process for updating a sequence table and selecting a national center.

A procedure for updating the sequence tables and selecting the national center will be described below with reference to the flowchart of FIG. 10. The program represented by the flowchart of FIG. 10 is executed by a processor in each of the C1, C2, C3, C4. The numerals following the letter "T" in FIG. 10 indicates step numbers. In the above description, the national center C1 is subjected to a fault. However, a fault communication message is also issued when a fault happens to any central supervisor CSV which is not the national center. The flowchart of FIG. 10 also includes such a fault condition.

[T1] The central supervisor CSV monitors received communication messages. If the central supervisor CSV finds a communication message which indicates a fault of any one of the C1, C2, C3, C4, then it reads the address of the CSV that is being subjected to a fault.

[T2] A control number n is set to 0.

[T3] The control number n is incremented by "1".

[T4] The address read in the step T1 is compared with the nth table value of the sequence table. If the address and the nth value do not agree with each other, control returns to the step T3. If the address and the nth value agree with each other, control goes to a step T5.

[T5] The nth table value is deleted from the sequence table, and (n+1)th and following table values are carried up in the sequence table.

[T6] The central supervisor CSV compares the address of its own station with the first table value of the sequence table. If the address and the first table value do not agree with each other, then since the central supervisor CSV is required to become the national center, the program comes to an end. If the address and the first table value agree with each other, then control proceeds to a step T7.

[T7] The central supervisor CSV changes itself to the national center.

FIG. 11(a) shows a sequence table showing a sequence of C1, C2, C3, C4 in the order named before it is updated. FIG. 11(b) shows a sequence table after it is updated because of a fault of the national center C1. In FIG. 11(b), the C1 which was in the first position of the sequence table prior to updating is deleted from the sequence table, and the C2 is carried up to the first position to become the new national center.

If the third C3 suffers a fault before the sequence table is updated as shown in FIG. 11(a), then the first and second table values remain unchanged and the third table value is updated to the C4 in the sequence table shown in FIG. 11(b). In this case, therefore, the C1 remains the national center.

Transmission of fault data between an extensive supervisor (XSV) and a central supervisor (CSV), and generation of a current table and history data will be described below.

Figure 12:
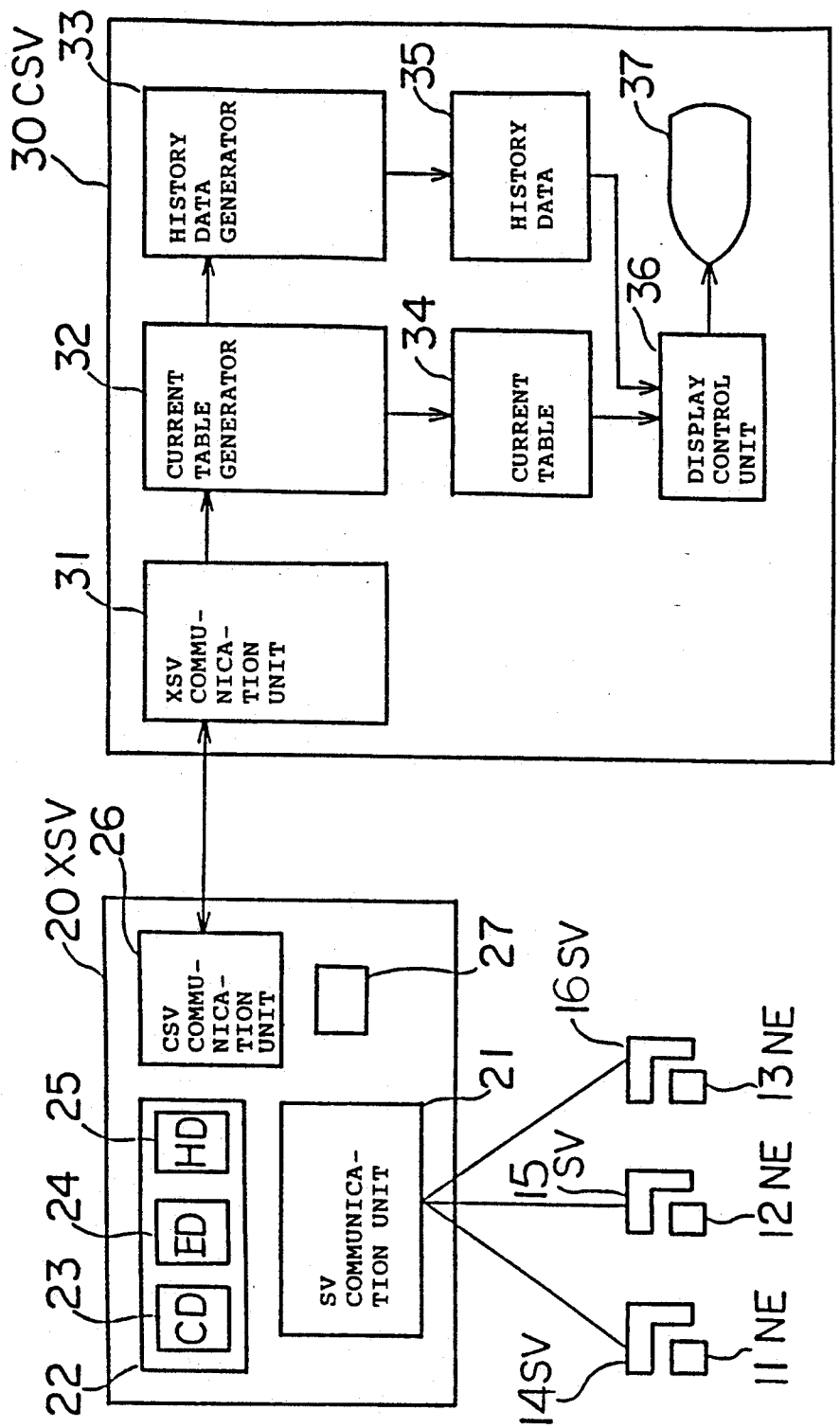
FIG. 12 is a detailed block diagram of a centralized supervisory system.

FIG. 12 shows in detail a centralized supervisory system for a transmission network, the centralized supervisory system being composed of an extensive supervisor (XSV) and a central supervisor (CSV). The centralized supervisory system will first briefly be described with reference to FIG. 12. The extensive supervisory (XSV), denoted at 20, collect status data from transmission network elements (NE) 11, 12, 13 through supervisors (SV) 14, 15, 16, respectively, and transmits the collected status data to the central supervisor (CSV), denoted at 30. The status data comprise current data (CD) 23, event data (ED) 24, and historical data (HD) 25. The current data (CD) 23 represent current statuses of all items to be supervised of the transmission network elements (NEs). The event data (ED) 24 represent changes (i.e., occurrence of and restoration from faults) in items after the previous transmission of the status data to the central supervisor (CSV) 30. The historical data (HD) 25 are data stored in a buffer memory as successive event data (ED) 24. The central supervisor (CSV) 30 has a current table generator 32 for generating a current table 34, a history data generator 32 for generating history data 35, and a display unit 37 for displaying the statuses of the transmission network elements (NEs) 12, 13, 14. The central supervisor (CSV) 30 manages the fault history of each of the transmission network elements with the history data 35.

The extensive supervisor (XSV) 20 transmits first event data 24 as historical data 25 to the central supervisor 30.

When the central supervisor 30 is set up, it sets the data in the current table 34 corresponding to the respective transmission network elements 11, 12, 13 to "UN-CONFIRMED STATUS".

When the historical data 25 are sent to the central supervisor 30, the current table 34 is not updated.

When the current data 23 are sent to the central supervisor 30, if the current data 23 are different from the contents of the current table 34, the current table 34 is updated.

When the current data 23 are sent to the central supervisor 30, if the current data 23 are different from the contents of the current table 34, the current data are sent to the history data generator 33 to generate history data 35.

When the transmitted data are historical data 25, the central supervisor 30 determines whether there are fault data identical to the historical data 25, and generates new history data if there are no such fault data.

When the transmitted data are indicative of "RE-STORED", the central supervisor 30 checks "OC-CURRED" data corresponding to the restoration data in the history data 35, and write the time of restoration.

The history data 35 include at least the attribute, name, the time of occurrence of, and the time of restoration from each of faults A, B, C.

The extensive supervisor 20 transmits the current data 23, the event data 24, and the historical data 25 as fault data to the central supervisor 30, which updates the current table 34 and generates history data 35 according to the transmitted data. In this manner, the data processing is carried out efficiently, the idle time (setting-up time) of the central supervisor 30 is shortened, and overlapping data are prevented from being recorded.

When the central supervisor 30 is set up, the first event data 24 are sent as the historical data 25. Therefore, the event data 24 can easily be converted into the historical data 25.

Furthermore, when the central supervisor 30 is set up, it sets all the contents of the current table 34 to "UNCONFIRMED STATUS". Thereafter, the central supervisor 30 receives data from the extensive supervisor 20, confirms the statuses of the respective transmission network elements 11, 12, 13, rewrites the current table 34 to record "RESTORED" in the even of no fault. Accordingly, the status of an unconfirmed transmission network element will not be displayed as "RE-STORED". The transmission network elements 11, 12, 13 are thus displayed as being unconfirmed, subjected to a fault occurred, or restored from a fault. In addition, not only the transmission network elements 11, 12, 13, but also routes connected thereto can be recognized by displaying the statuses of the transmission network elements 11, 12, 13. As a result, the operating condition of the entire network can accurately be recognized.

When the historical data 25 are transmitted, the current table 34 is not updated. In this manner, the data displayed on the display unit 37 when the central supervisor 30 are not disturbed by the data of past faults, and the idle time (setting-up time) of the central supervisor 30 is reduced.

When the current data 23 are sent, they are compared with the corresponding data in the current table 34, and the current table 34 is updated only if the compared data differ from each other. Thus, the current table 34 is not required to be updated every time.

Only when the current data 23 and the data in the current table 34 differ from each other, history data 35 are generated. Consequently, identical fault data are prevented from overlapping each other in the history data 35.

The history data 35 are checked to determine whether identical faults are produced only when the historical data 25 are received. As a result, identical history data are prevented overlapping from each other. The checking process is efficient as the history data 35 are checked only when the historical data 25 are received.

When the transmitted data are indicative of "RE-STORED", the central supervisor 30 checks the history data 35 for corresponding data of "OCCURRED", and writes the time of restoration. The history data 35 are thus generated with respect to respective faults.

As the history data 35 contain data of the attribute, the time of occurrence of, and the time of restoration from each of the faults, any faults of the transmission network elements 11, 12, 13 can accurately be managed according to the history data 35.

The centralized supervisory system will now be described in greater detail with reference to FIG. 12.

Generally, a transmission network has a number of transmission network elements NE such as terminal repeaters, repeaters, or the like. For the sake of brevity, it is assumed that the illustrated transmission network has three NEs 11, 12, 13. The NEs 11, 12, 13 are supervised by respective SVs 14, 15, 16, and their status data are collected by a higher-level XSV 20. Actually, supervisors are provided in a hierarchical structure having a number of layers or levels. However, it is assumed in FIG. 12 that the SVs 14, 15, 16 are connected to the XSV 20. Specifically, the SVs 14, 15, 16 are connected to an SV communication unit 21 of the XSV 20, and transmit data to the SV communication unit 21. Communication between the SVs 14, 15, 16 and the XSV 20 is effected according to the HLDC.

The SV communication unit 21 divides the status data from the NEs 11, 12, 13 into current data (CD) 23, event data (ED) 24, and historical data (HD) 25, and stores these data in a buffer memory 22. These data will be described in detail later on. A current data request flag 27 is a flag which is written when the XSV 20 is requested to transmit data by the SCV 30. The requested data are transmitted as communication messages through a CSV communication unit 26 to the CSV 30.

The CSV 30 receives the transmitted data through an XSV communication unit 31. Communication between the XSV 20 and the CSV 30 is effected according to the HLDC in ABM (Asynchronous Balanced Mode). Using the received data, the current table generator 32 generates the current table 34, and the history data generator 33 generates the history data 35. The details of the generation of the current table 34 and the history data 35 will be described later on. The current table 34 and the history data 35 are converted into display signals by a display control unit 36, and displayed on the display unit 37.

Figure 13:
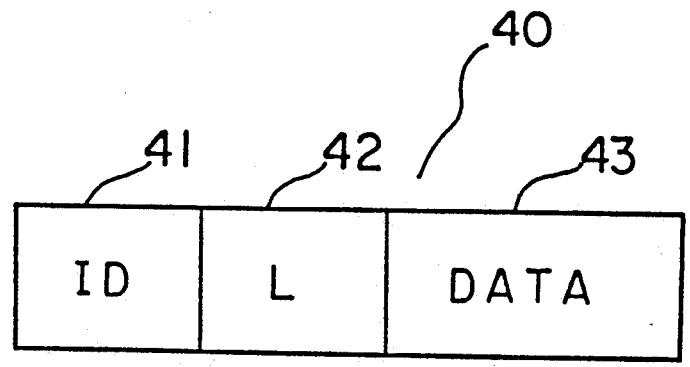
FIG. 13 is a diagram showing the data frame structure of a communication message.

The frame structure of a communication message that is transmitted between the XSV 20 and the CSV 30 is shown in FIG. 13. The communication message has a data frame 40 composed of an identifier (ID) 41, a data length (L) 42, and data (DATA) 43. The identifier (ID) 41 indicates the type of the communication message, and is expressed by a 1-byte code which represents one of the following meanings:

C1 or E1: The data are current data;
E3: The data are historical data; and
C2 or E2: The data are event data.

The data length (L) 42 indicates the length of the data (DATA) 43. The data (DATA) 43 contain the address of the NE and the contents of a fault.

When the CSV 30 or the XSV 20 is set up, the CSV 30 issues a command to request current data, and, in response to the command, the current data 23 are transmitted from the XSV 20 to the CSV 30. When the SVs 14–16 and the NEs 11–13 are set up, the SVs 14–16 and the NEs 11–13 transmit current data indicative of their statuses to a higher-level supervisor such as the XSV 20, for example. At this time, the XSV 20 does not issue a command to request current data to the SVs 14–16. The event data 24 are data indicative of the occurrence of and restoration from a fault of each of the NEs, and are transmitted each time such the NE suffers a fault or is restored from a fault.

The historical data are data required to shorten the idle time (setting-up time) of the CSV 30 and solve problems that arise when the history data 35 is generated i the CSV 30. The historical data exist only between the XSV 20 and the CSV 30, but not in the SVs 14–16 which do not have a function to display faults and history data.

Figure 14:
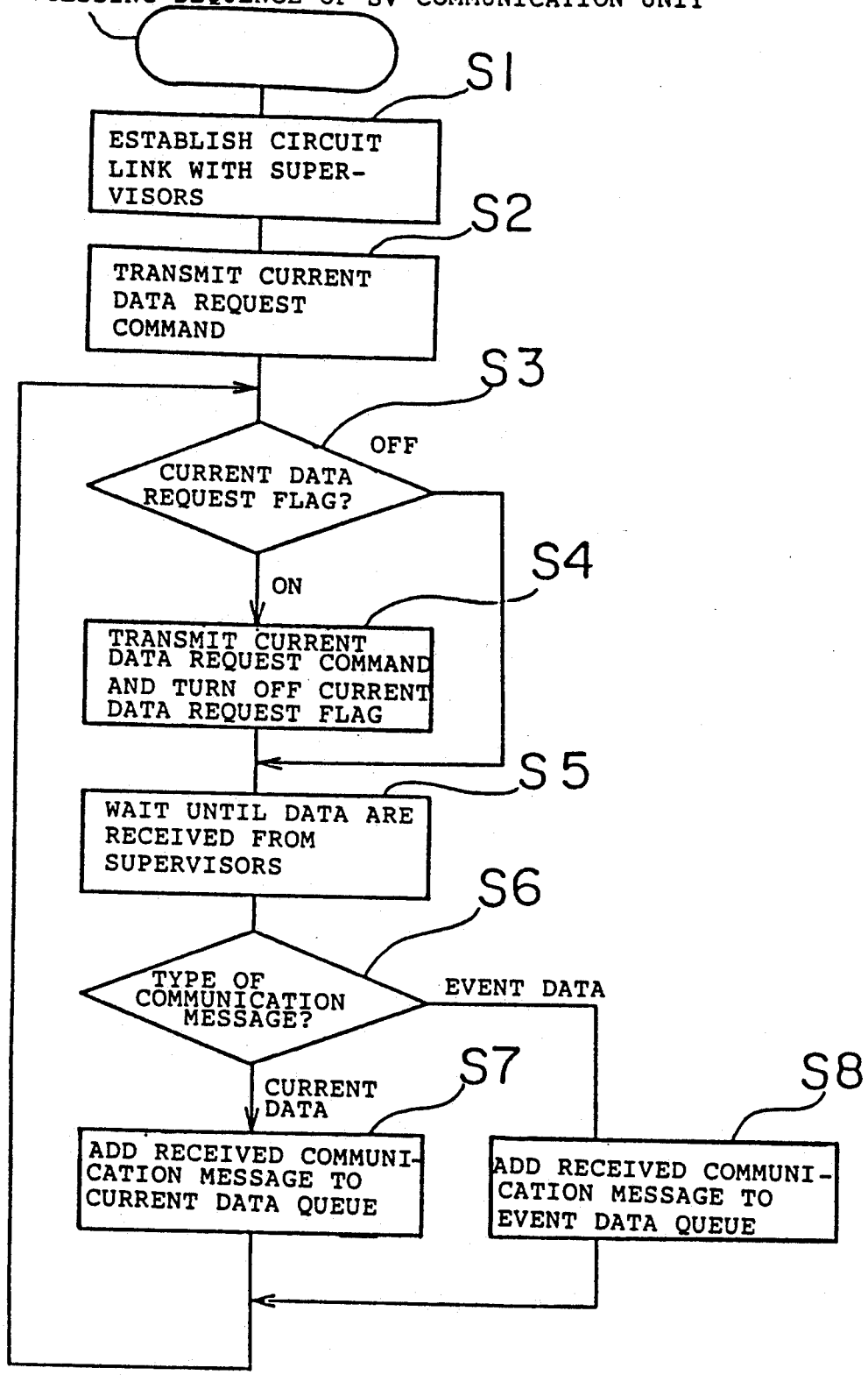
FIG. 14 is a flowchart of a processing sequence carried out by a supervisor (SV) communication unit.

A processing sequence of the SV communication unit 21 of the XSV 20 will be described with reference to FIG. 14. The numerals following the letter "S" in FIG. 14 indicate step numbers.

[S1] The SV communication unit 21 establishes a communication link with the SVs 14–16.

[S2] The SV communication unit 21 transmits a request command to request current data to the SVs 14–16.

[S3] The SV communication unit 21 determines whether the current data request flag 27 from the CSV 30 is on or off. If on, control goes to a step S4, and if off, control jumps to a step S5.

[S4] The SV communication unit 21 transmits a request to request current data to the SVs 14–16, and turns off the current data request command 27.

[S5] The SV communication unit 21 waits until it receives current data from the SVs 14–16.

[S6] The SV communication unit 21 checks the ID 41 of a communication message from each of the SVs 14–16. If the communication message is indicative of current data, then control proceeds to a step S7, and if the communication messages is indicative of event data, then control goes to a step S8.

[S7] Since the communication message is indicative of current data, the SV communication unit 21 adds the received communication message to a queue of current data, forming a chain of individually transmitted current data. The SV communication unit 21 will send the chain to the CSV 30 in the future.

[S8] Since the communication message is indicative of event data, the SV communication unit 21 adds the received communication message to a queue of event data, forming a chain of individually transmitted event data. The SV communication unit 21 will send the chain to the CSV 30 in the future.

The queue of communication messages formed in the step S7 or S8 is transmitted as the current data (CD) 23 or the event data (ED) 24 to the CSV 30 in the step S4 in response to a data request command from the CSV 30.

Figure 15:
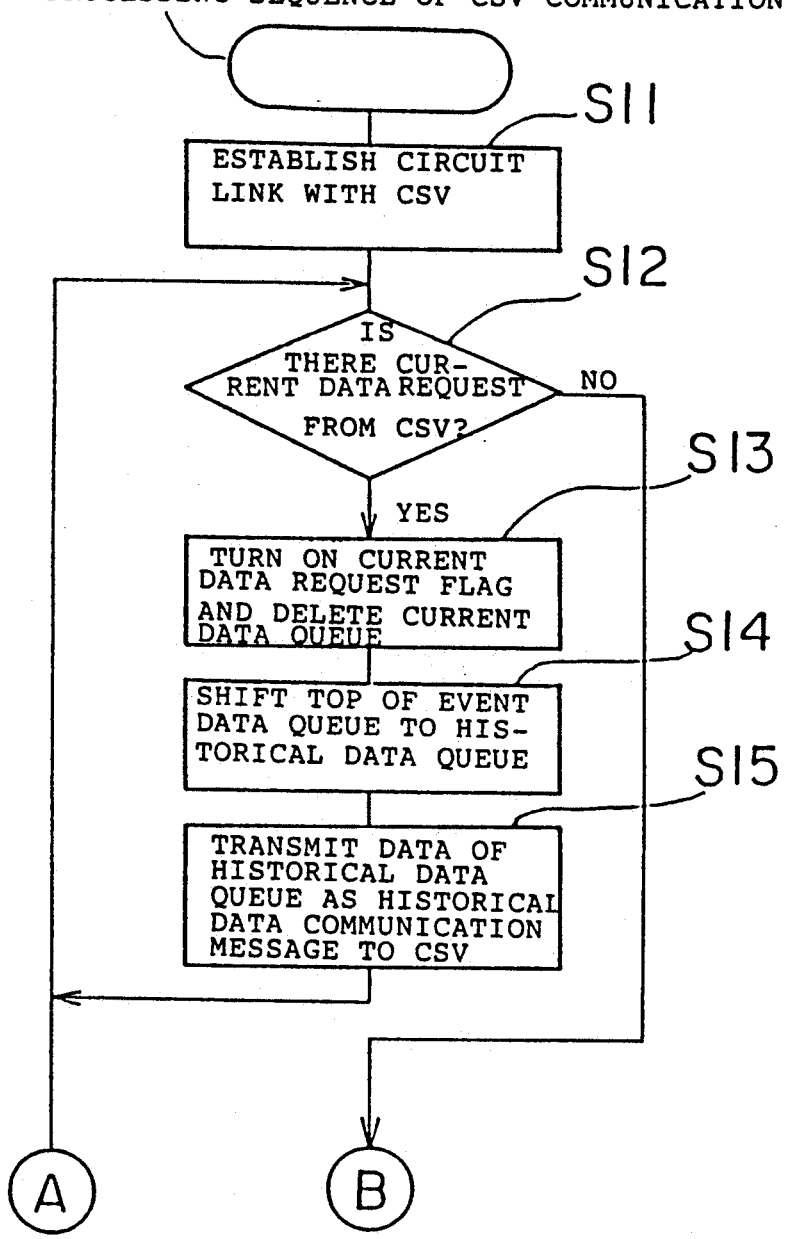
FIGS. 15 and 16 are a flowchart of a processing sequence carried out by a central supervisor (CSV) communication unit.
Figure 16:
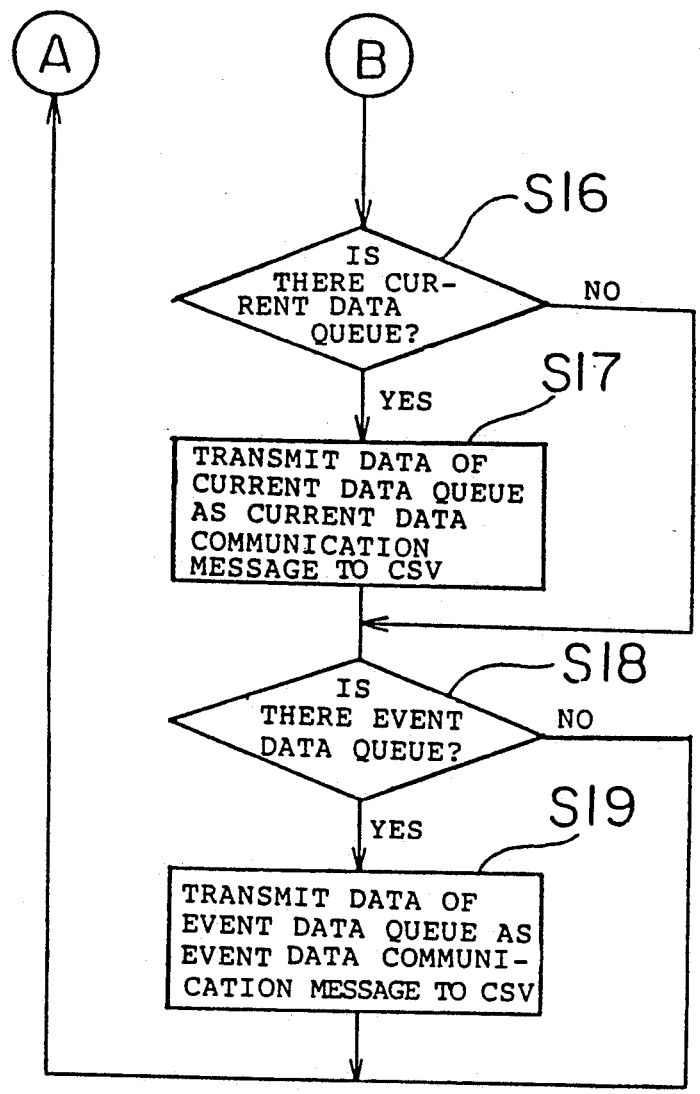

A processing sequence of the CSV communication unit 26 of the XSV 20 will be described with reference to FIGS. 15 and 16.

[S11] The CSV communication unit 26 establishes a communication link with the CSV 30.

[S12] The CSV communication unit 26 determines whether there is a current data request transmitted from the CSV 30 or not. If there is, control goes to a step S13, and if not, control jumps to a step S16 (FIG. 16).

[S13] As there is a current data request, the CSV communication unit 26 turns on the current data request flag 27, and deletes a current data queue.

[S14] The CSV communication unit 26 shifts the top of an event data queue to a historical data queue. That is, since the first event data are historical data, the CSV communication unit 26 is prepared to send historical data.

[S15] The CSV communication unit 26 transmits the historical data 25 of the historical data queue as a historical data communication message to the CSV 30.

[S16] The CSV communication unit 26 determines whether there is a current data queue or not. If there is, control goes to a step S17, and if not, control goes to a step S18.

[S17] The CSV communication unit 26 transmits the current data 23 as a current data communication message to the CSV 30.

[S18] The CSV communication unit 26 determines whether there is an event data queue or not. If there is, control goes to a step S19, and if not, control returns to the step S12.

[S19] The CSV communication unit 26 transmits event data 24 of the event queue as an event data communication message to the CSV 30.

Figure 17:
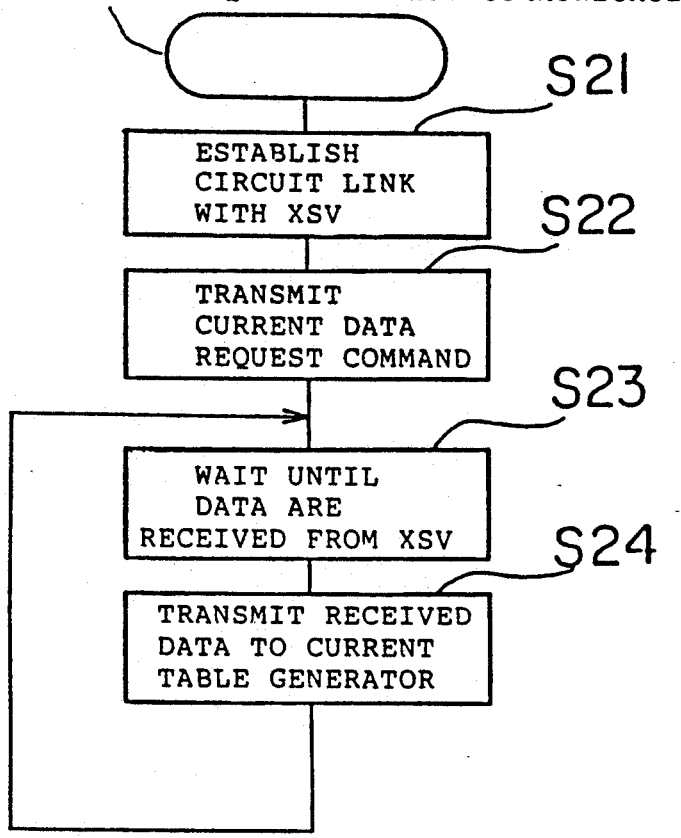
FIG. 17 is a flowchart of a processing sequence carried out by an XSV.

A processing sequence of the XSV communication unit 31 of the CSV 30 will be described with reference to FIG. 17.

[S21] The XSV communication unit 31 establishes a communication link with the XSV 20.

[S22] The XSV communication unit 31 transmits a request command to request current data to the XSV 20.

[S23] The XSV communication unit 31 waits for data (current data, event data, and historical data) from the XSV 20.

[S24] When the data are transmitted, the XSV communication unit 31 sends the data to the current table generator 32.

Figure 18:
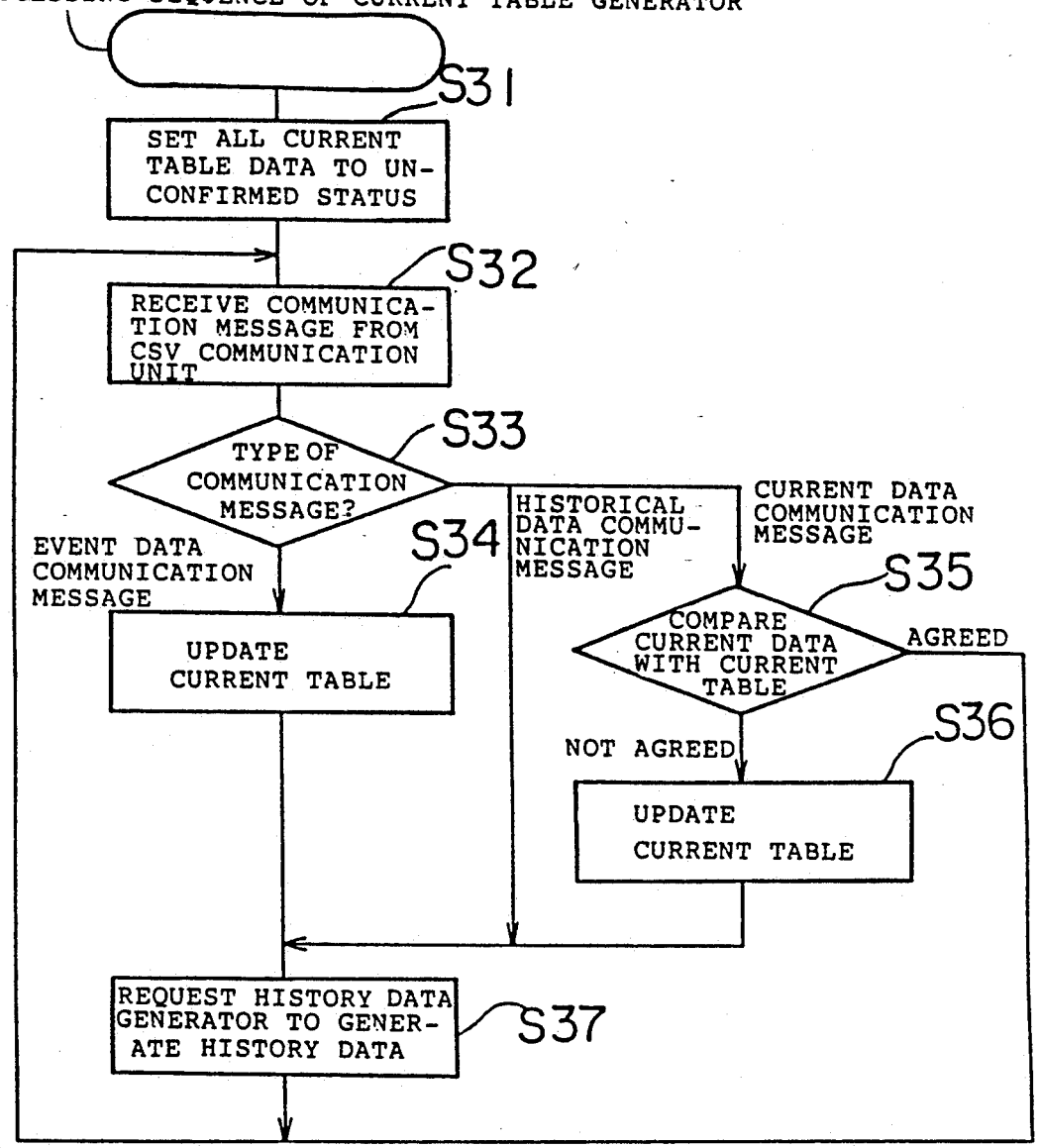
FIG. 18 is a flowchart of a processing sequence carried out by a current table generator.

A processing sequence of the current table generator 32 will be described below with reference to FIG. 18.

[S31] Since there are no data relative to the NEs 11, 12, 13 at first, the current table generator 32 sets all the data in the current table to "UNCONFIRMED STATUS". The NEs 11, 12, 13 are in the unconfirmed status and that status is displayed on the display unit 37 until current data are transmitted.

[S32] The current table generator 32 receives a communication message from the CSV communication unit 26 of the XSV 20.

[S33] The current table generator 32 checks the contents of the received communication message. If the received communication message is an event data communication message, control goes to a step S34. If the received communication message is a historical data communication message, control goes to a step S37. If the received communication message is a current data communication message, control goes to a step S35.

[S34] Since the received communication message is indicative of event data, the current table generator 32 updates the current table 34.

[S35] Since the received communication message is indicative of current data, the current table generator 32 compares the current data with the contents of the current table 34. If the compared data do not agree with each other, control goes back to the step S32. At this time, the current table generator 32 does not send the data to the history data generator 33 in order to avoid overlapping of identical history data when the XSV 20 is set up again. If the compared data agree with each other, then since the current data 34 is not rewritten, no useless change occurs in the data displayed on the display unit 37.

[S36] If the compared data do not agree with each other, then because the current data have changed, the current table generator 32 updates the current table 34.

[S37] The current table generator 32 request the history data generator 33 to generate history data 35 if necessary.

Figure 19:
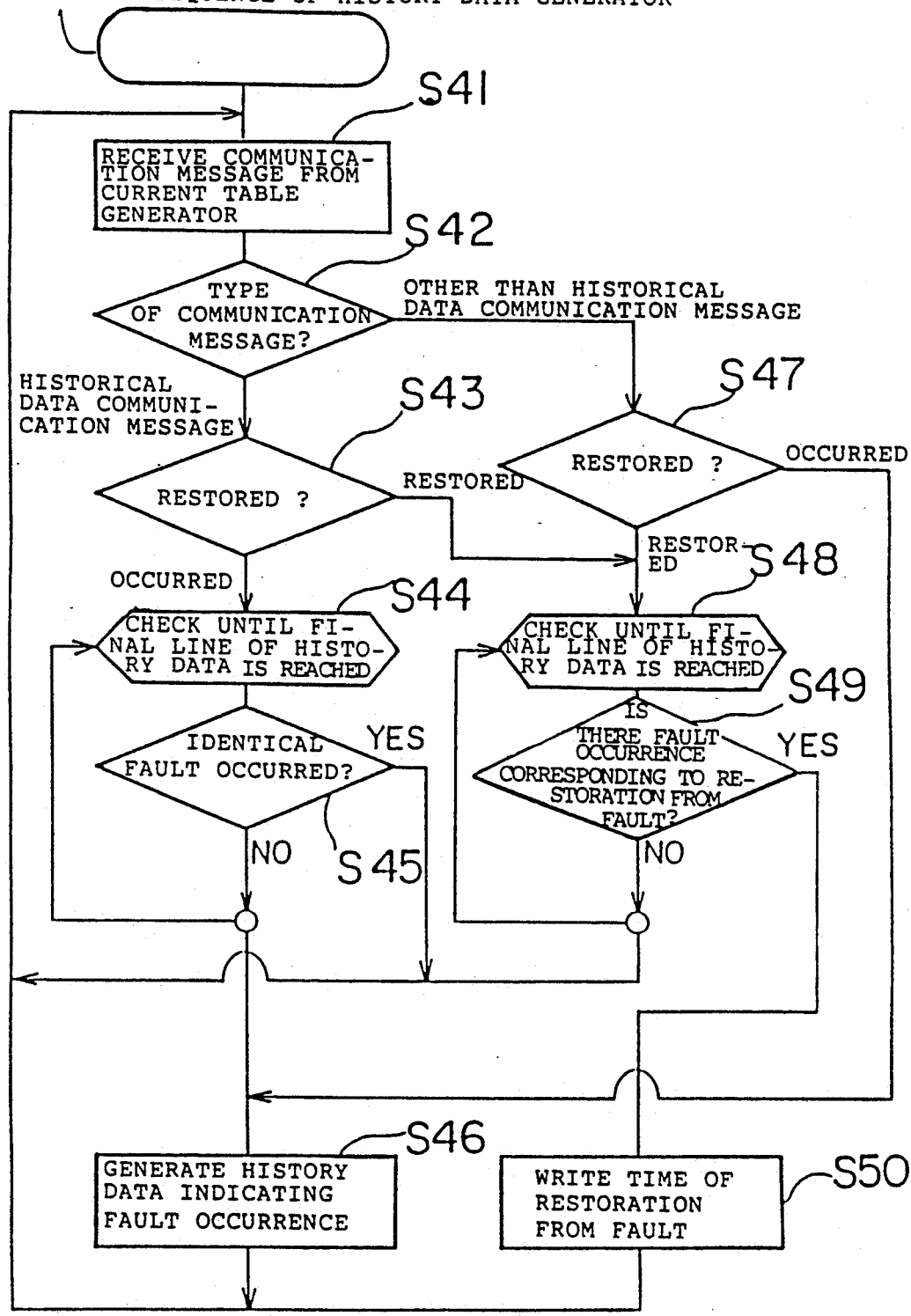
FIG. 19 is a flowchart of a processing sequence carried out by a history data generator.

A processing sequence of the history data generator 35 will be described below with reference to FIG. 19.

[S41] The history data generator 35 receives a communication message from the current table generator 32.

[S42] The history data generator 35 checks the type of the received communication message. If the received communication message is a historical data communication message, control goes to a step S43. If the received communication message is other than a historical data communication message, control goes to a step S47.

[S43] The history data generator 35 determines whether the communication message represents the occurrence of or restoration from a fault. If the communication message represents the occurrence of a fault, then control goes to a step S44. If the communication message represents the restoration from a fault, then control goes to a step S48.

[S44]/[S45] The history data generator 35 determines whether there is an identical fault having occurred with respect to each line of the history data 35. If not, then control proceeds to a step S46, and if there is, then control returns to the step S41 and continues the above process until the final line of the history data 35 is reached. This process is effective to avoid the generation of identical overlapping history data. Inasmuch as the history data 35 is checked only when the received communication message is a historical data communication message, the process is efficient.

[S46] The history data generator 35 generates history data indicating the occurrence of the fault.

[S47] The history data generator 35 determines whether the communication message represents the occurrence of or restoration from a fault. If the communication message represents the restoration from a fault, then control goes to the step S48. If the communication message represents the occurrence of a fault, then control goes to the step S46 for the generation of history data.

[S48]/[S49] The history data generator 35 searches the history data 35 for data "OCCURRED" corresponding to data "RESTORED" until the final line is reached. If data "OCCURRED" is found, control goes to a step S50, and if not, control goes back to the step S41.

[S50] Inasmuch data "OCCURRED" corresponding to data "RESTORED" is found, the history data generator 35 writes the time of restoration from the fault.

The history data 35 will be described in detail. FIG. 20 shows data contents 50 written in the lines of the history data 35. A number of history data 35 with the data contents 50 as one unit are stored in a nonvolatile memory such as a hard disk or a floppy disk.

The attribute of a fault indicates the type of the fault, which may be an important alarm, an unimportant alarm, a response alarm, or the like. The name of a fault indicates a name or an identification code of the fault. The name of a transmission network element indicates the name of a transmission network element suffering a fault or an identification code of the transmission network element. The place of a fault is the station name of a transmission network element to which a fault has occurred, or the name of a route being subjected to a fault. The address of a transmission network element indicates the address according to the HLDC of a transmission network element which is having a fault. Other data of the history data 35 include the time of occurrence of a fault, the time of restoration from a fault, and the period of time for which a fault continued.

Figure 21:
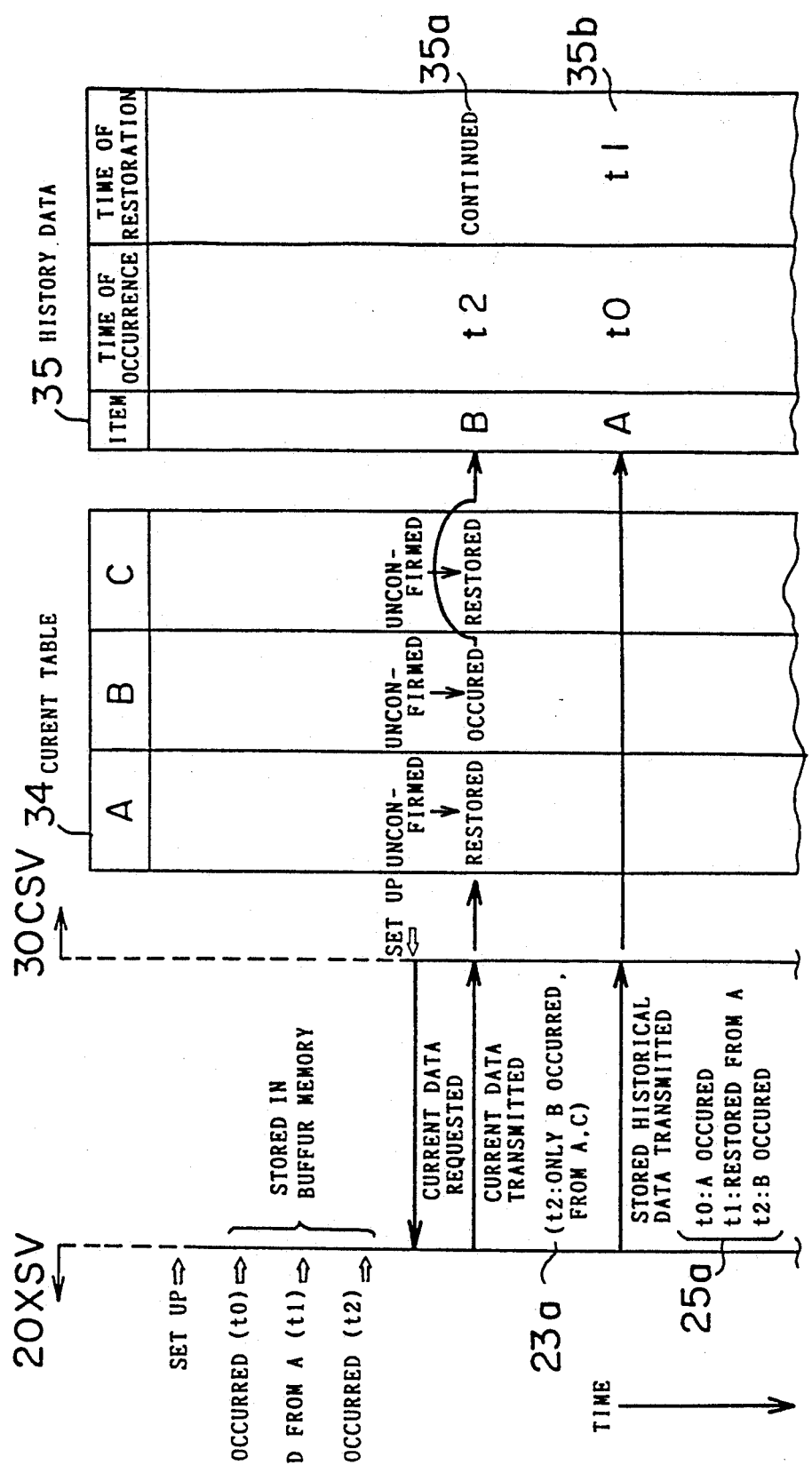
FIG. 21 is a timing chart of a time sequence in which a CSV side is set up after an XSV side is set up.

The centralized supervisory system of the aforesaid structure operates as follows: FIG. 21 is a timing chart of a time sequence in which the CSV 30 is set up after the XSV 20. It is assumed for the sake of brevity that there are three faults A, B, C. As shown in FIG. 21, the XSV 20 side is set up, subjected to a fault A at a time t0, then restored from the fault A at a time t1, and subjected again to a fault B at a time t2. During this time, the CSV 30 side has not been set up, and data are stored in the buffer memory 22 of the XSV 20.

Then, when the CSV 30 side is set up, the CSV 30 sets all the contents of the current table 34 to "RESTORED", and issues a request command to request current data from the XSV 20. In response to the request command, the XSV 20 sends current data 23a representing current data (restored from A, B occurred, restored from C) to the CSV 30. Based on the supplied current data 23a, the CSV 30 produces a current table 34 and also history data 35a with respect to the fault B. Then, the XSV 20 transmits stored data as historical data 25a to the CSV 30. Based on the transmitted historical data 25a, the CSV 30 generates history data 35b indicating occurrence of and restoration from of the fault A, but does no update the current table 34. The data of the occurrence of the fault B is not generated as it exists as the history data 35a in the history data 35.

Figure 1:
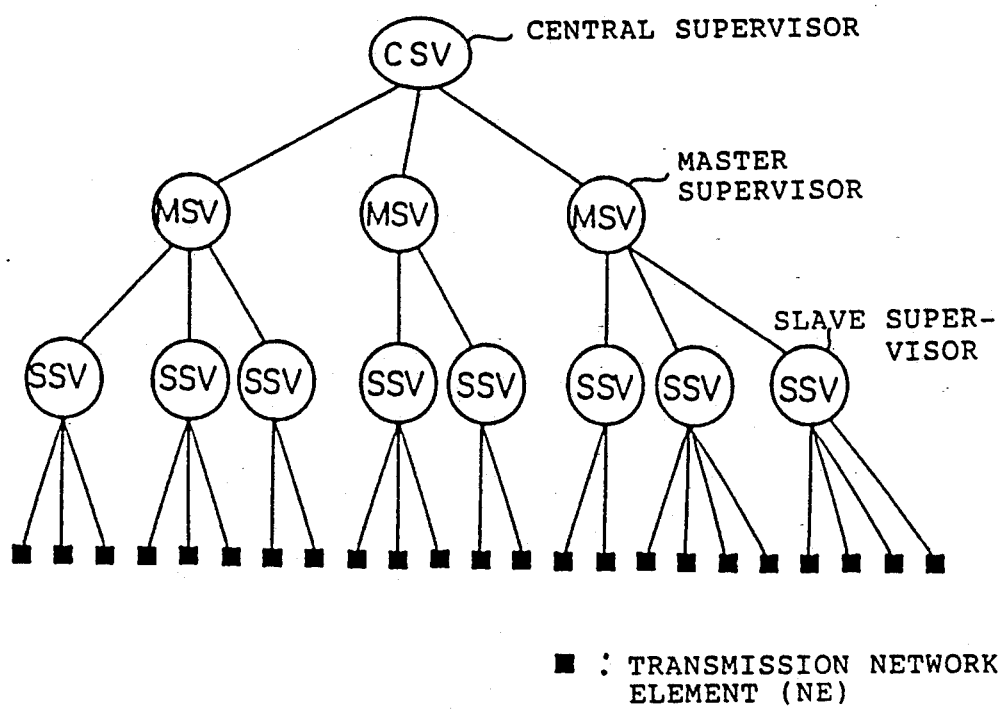
FIG. 1 is a block diagram of a conventional centralized supervisory system.
Figure 2:
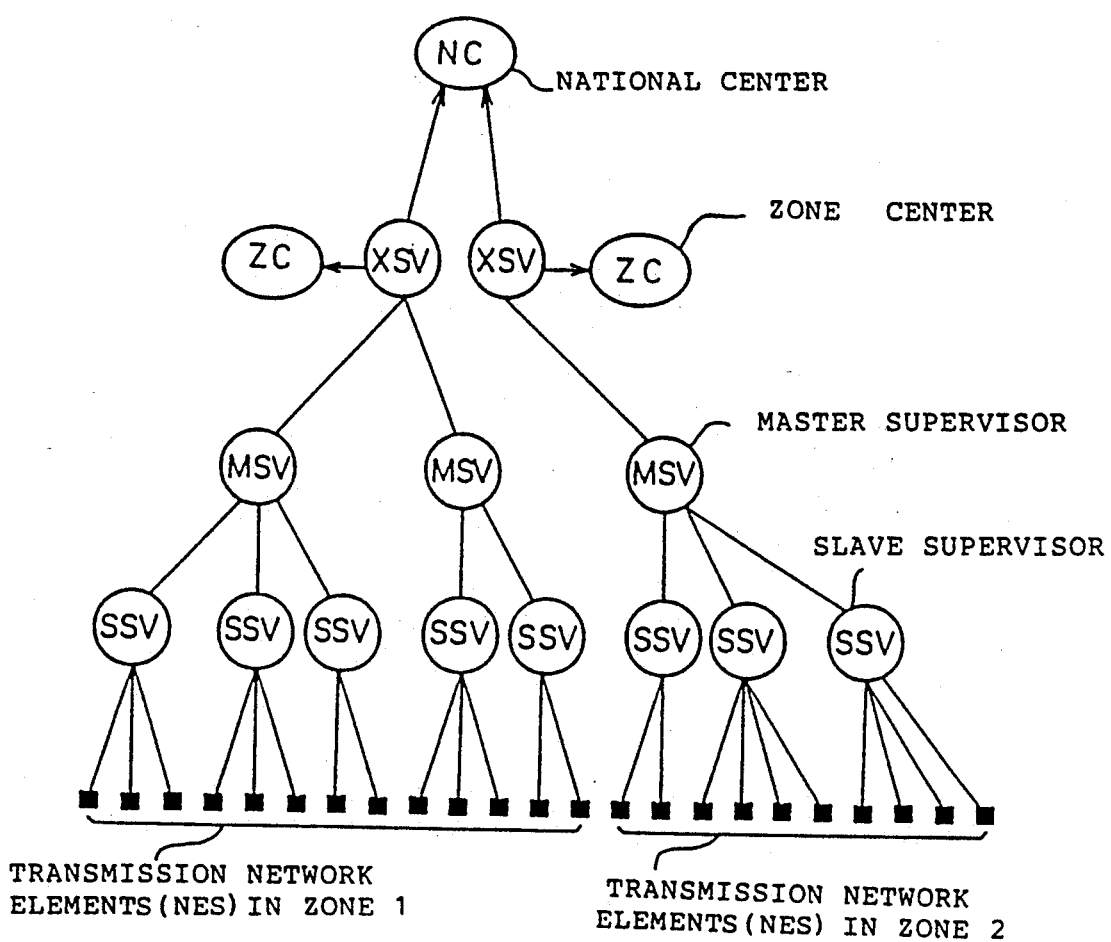
FIG. 2 is a block diagram of a larger-scale conventional centralized supervisory system.
Figure 3:
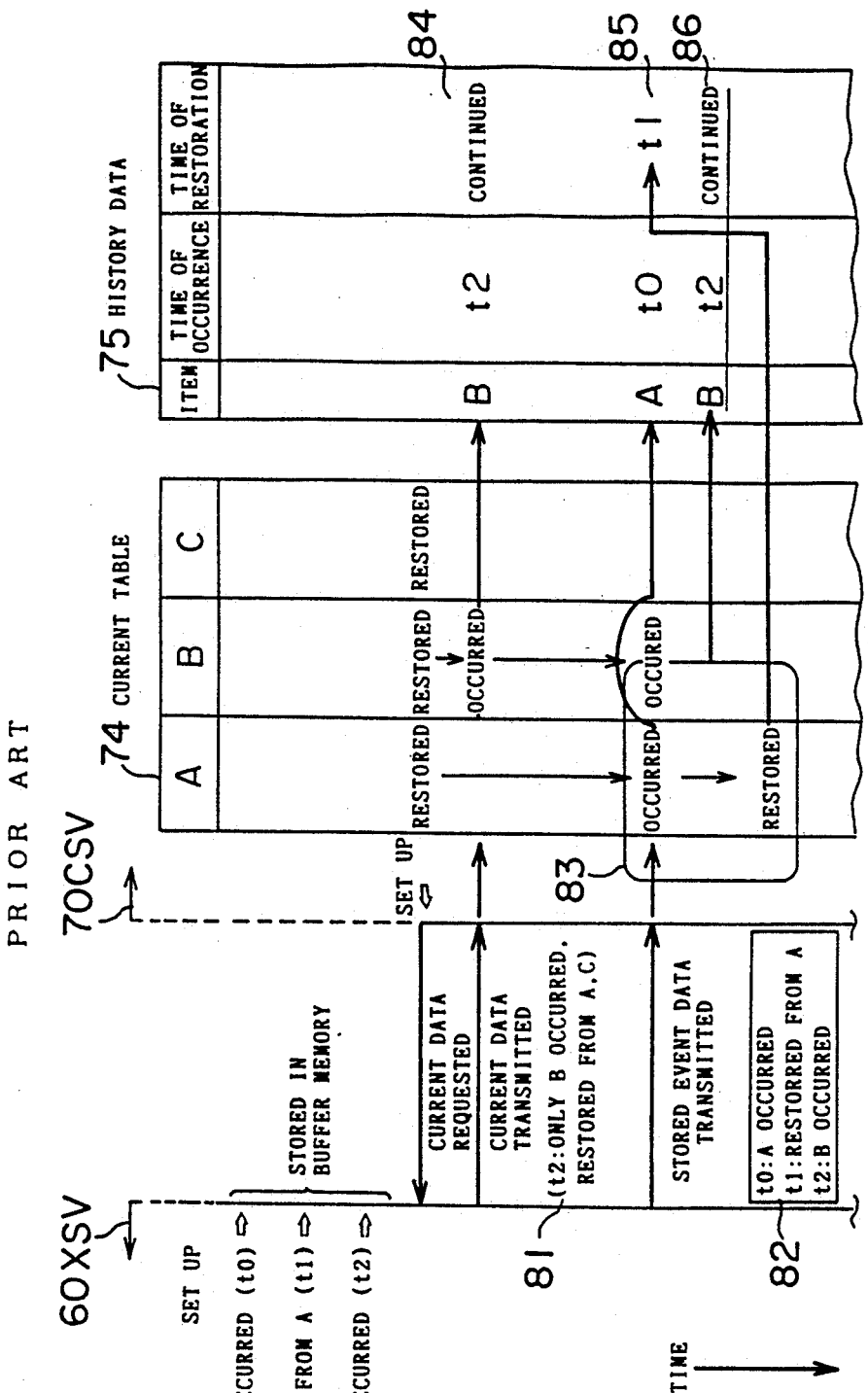
FIG. 3 is a timing chart of a conventional time sequence in which a CSV side is set up after an XSV side is set up.

In FIG. 3, two history data 84, 86 of the fault B are generated in the history data 75. In FIG. 21, however, the stored data is processed as the historical data 25a, and the current table 34 is not updated. Therefore, the idle time (setting-up time) of the CSV 30 side is shortened.

Figure 22:
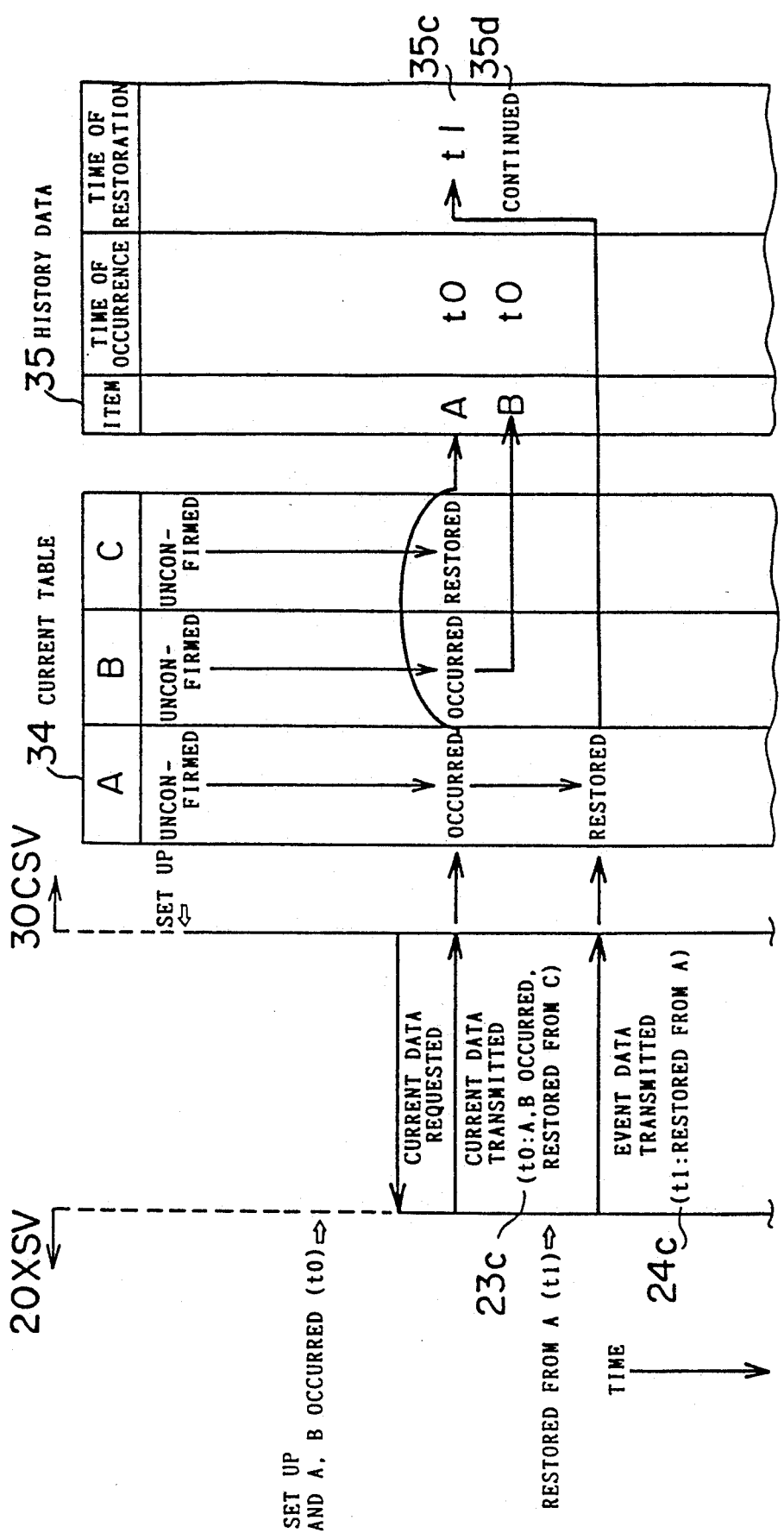
FIG. 22 is a timing chart of a time sequence in which an XSV side is set up after a CSV side is set up.

FIG. 22 shows a time sequence in which the XSV side 20 is set up after the CSV 30 side.

As shown in FIG. 22, the CSV 30 side is set up, clears all the contents of the current table 34, i.e., writes "RESTORED", then waits for a circuit link to be connected to the XSV 20 side. Then, the XSV 20 side is set up, and faults A, B occur at a time t0. The CSV 30 side issues a request command for requesting current data from the XSV 20. In response to the request command, the XCV 20 sends current data 23c representing current data (A, B occurred, restored from C at t0) to the CSV 30. Based on the supplied current data 23c, the CSV 30 produces a current table 34 and also history data 35c, 35d with respect to the faults A, B. When restored from the fault A at a time t1, the XSV 20 sends event data 24c indicative of the restoration from the fault A to the CSV 30. Based on the event data 24c, the CSV 30 writes "RESTORED" in the item A in the current table 34, and checks an item corresponding to the fault A in the history data 35 and also writes "t1" in the restoration time of the history data 35c.

Figure 4:
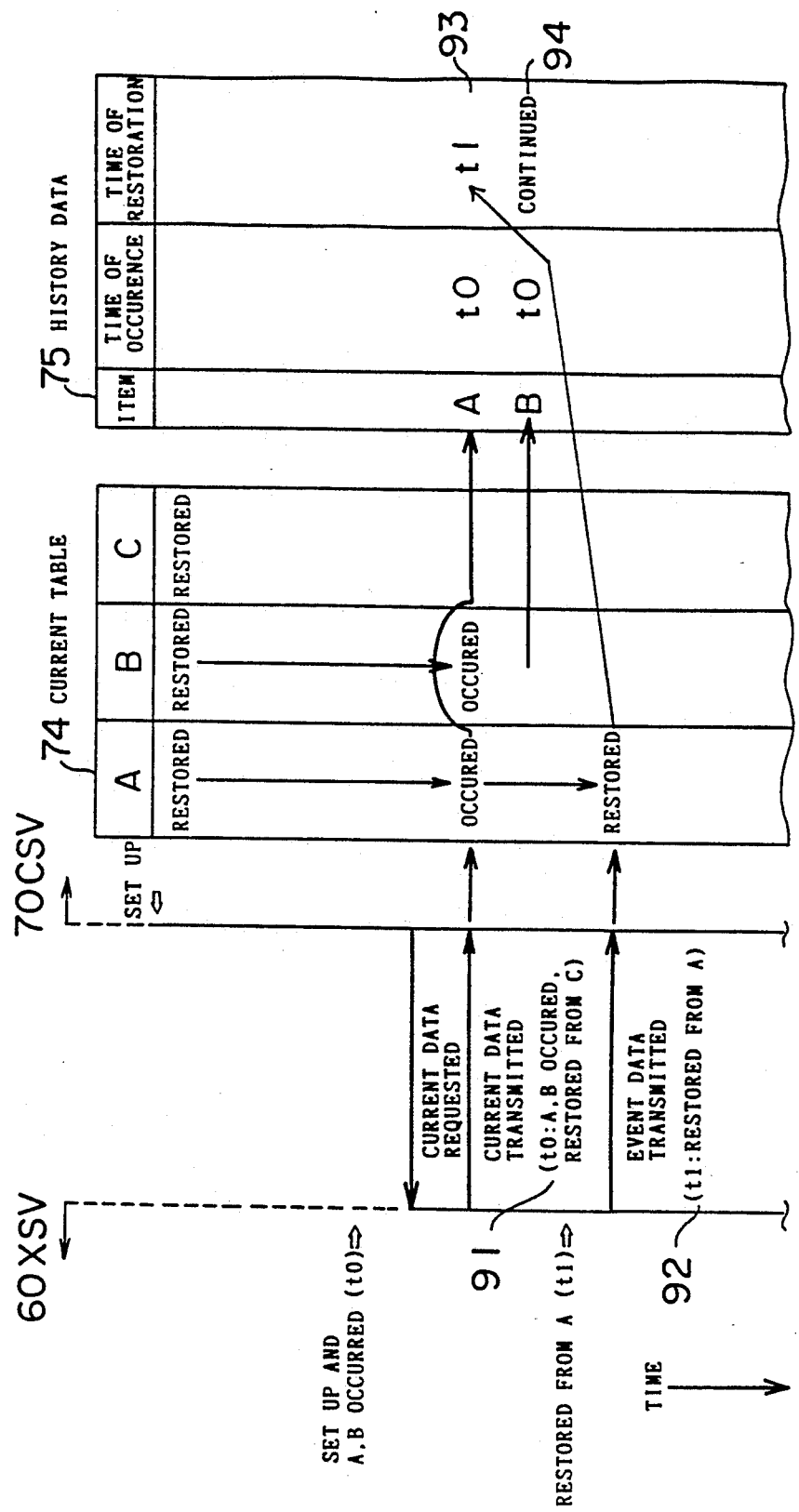
FIG. 4 is a timing chart of a conventional time sequence in which a CSV side is set up before an XSV side is set up.

In FIG. 4, when the CSV 70 side is set up, the CSV 70 clears all the contents of the current table 74 and write "RESTORED" in the current table 74. Therefore, the NEs which are unconfirmed are recognized as being restored, i.e., operating normally. In FIG. 22, the CSV 30 does not set the contents of the current table 34 to "RESTORED", but "UNCONFIRMED". Therefore, the display unit displays the unconfirmed statuses of the unconfirmed NEs 11, 12, 13. For example, a normal NE is displayed as a blue NE, and NE suffering a fault as a red NE, and an unconfirmed NE as a gray NE on the display unit 37. As a result, the statuses of any unconfirmed NEs are not displayed as being normal. At the same time that the statuses of the NEs are displayed, the routes to which the NEs are connected are displayed in three different modes or colors. Therefore, the statuses of the NEs and the operating conditions of the routes can reliably be recognized.

Figure 23:
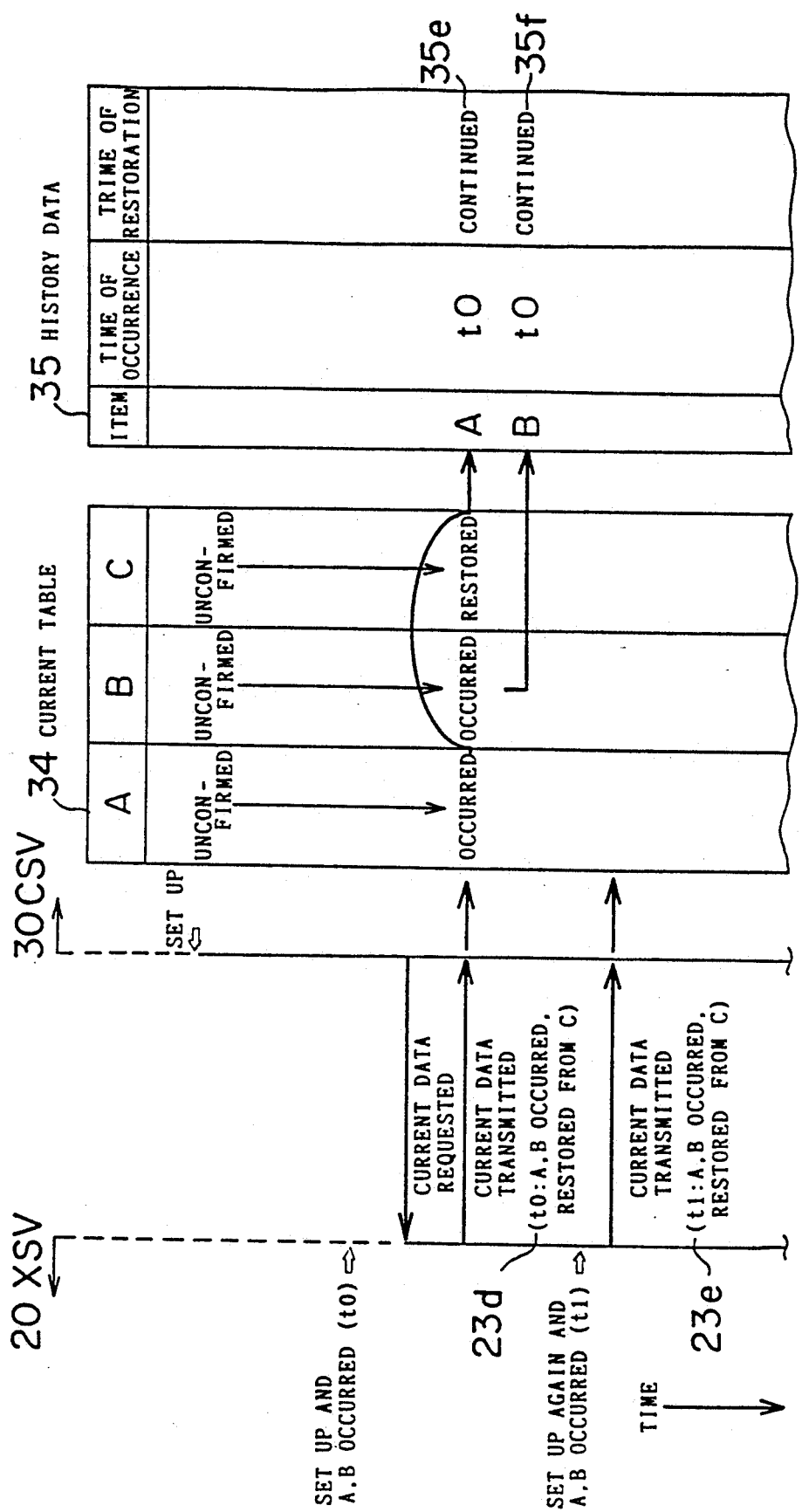
FIG. 23 is a timing chart of a time sequence in which after a CSV side is set up, an XSV side is set up, disabled, and set up again.

FIG. 23 shows a time sequence in which after the CSV 30 side is set up, the XSV 20 side that has once been set up is disabled and then set up again.

As shown in FIG. 23, the CSV 30 side is set up, then the XSV 20 is set up, and the CSV 30 side generates a current table 34 and also history data 35e, 35f based on current data 23d. Then, the XSV 20 side is disabled and set up again. At this time (t1), the XSV 20 sends current data 23e to the CSV 30. The CSV 30 compares the current data 23e and the current table 34. Since the current data 23e is the same as the contents of the current table 34, the CSV 30 does not change the current table 34 and generate history data 35.

Figure 5:
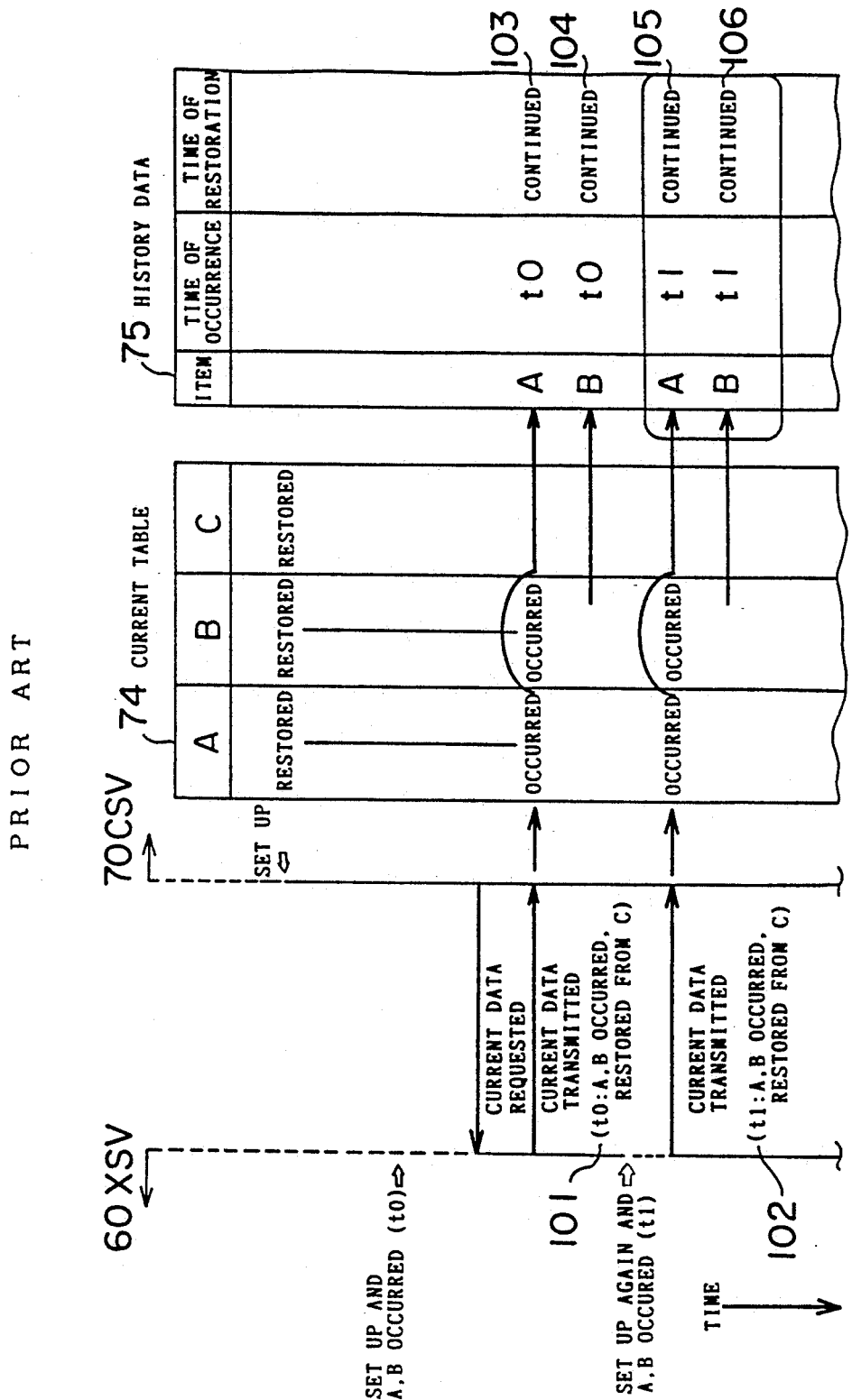
FIG. 5 is a timing chart of a conventional time sequence in which after a CSV side is set up, an XSV side is set up, disabled, and set up again.

In FIG. 5, when the XSV 60 side is set up again, the current table 74 is rewritten, and the display of the display unit flickers. The history data 105, 106 are generated and exist together with the history data 103, 104. In FIG. 23, however, the current data 23e is compared with the contents of the current table 34, and if they are not different from each other, the current table 34 is not changed and no history data 35 is generated. Thus, the current table 34 is prevented from being changed, and the display of the display unit 37 is prevented from flickering. No identical history data are generated and exist together with each other.

In the above illustrated embodiment, three NEs and three SVs are employed. Actually, however, there are several tens through several hundreds of NEs are connected, and supervisors are arranged as slave, master, and extensive supervisors in a hierarchical structure. While only three faults A, B, C have been described above, there are actually a considerable number of faults which happen to the NEs.

Since the supervisors transmit fault data as current data, event data, and historical data to the central supervisor, the current table is updated and the history data are generated according to the transmitted data. Therefore, the data can be processed efficiently, the central supervisor can be set up in a short period of time, and identical data are prevented from being generated and existing together with each other.

When the central supervisor is set up, first event data are transmitted as historical data, so that event data from supervisors can easily be changed to historical data.

When the central supervisor is set up, all the contents of the current table are set to unconfirmed statuses. Based on data received from the supervisors, the central supervisor confirms the statuses of the respective transmission network elements, and rewrites the current table. Consequently, the statuses of the unconfirmed transmission network elements are prevented from being displayed as restored statuses.

When historical data are transmitted, the current table is not updated. Therefore, the data displayed on the display unit when the central supervisor are not disturbed by the data of past faults, and the setting-up time of the central supervisor is shortened.

When current data are transmitted, they are compared with corresponding data in the current table. Since the current table is updated only if the compared data are different from each other, the process of updating the current table is simplified.

Only when current data and the contents of the current table differ from each other, history data are generated. As a result, identical fault data in the history data are prevented from being generated and existing together with each other.

The history data in the central supervisor are checked for the occurrence of identical faults only when historical data are received from supervisors. Therefore, identical history data are prevented from being generated in an overlapping manner. The checking process is efficient as it is carried out only when historical data are received.

If received data represent restoration from a fault, the central supervisor checks a corresponding occurrence in the history data and writes the time of restoration. Therefore, history data of respective faults are generated.

The data in the history data represent fault attributes, times of occurrence of faults, times of restoration from faults, etc. Consequently, faults of the transmission network elements can be managed accurately.

Although a certain preferred embodiment of the present invention has been shown and described in detail, it should be understood that various changes and modifications may be made therein without departing from the scope of the appended claims.

What is claimed is:

1. A system for centralized supervision of a plurality of interconnected transmission network elements, in a plurality of system zones, comprising:

a plurality of supervisors in each system zone, adapted to be connected respectively to the transmission network elements, for supervising respective statuses of the transmission network elements;

central supervisors, one in each system zone, for managing the transmission network elements based on supervisory data transmitted from said supervisors, each of said central supervisors including means for selecting, initially and in the event of a fault of the system supervisor a system supervisor from among said central supervisors, to supervise all the transmission network elements in all of the system zones; and extensive supervisors, each connected between said supervisors in one of the system zones and a corresponding central supervisor, for collecting the supervisory data from said supervisors and transmitting the collected supervisory data to the corresponding central supervisor and also to an adjacent extensive supervisor of an adjacent one of the system zones.

2. A system according to claim 1, wherein said extensive supervisors are connected in a ring-shaped network.

3. A system according to claim 2, wherein said extensive supervisors are connected by a unidirectional communication path in said ring-shaped network.

4. A method of supervising a plurality of connected transmission network elements with a centralized supervisory system comprising a plurality of system zones each comprising a plurality of supervisors, adapted to be connected respectively to the transmission network elements, for supervising respective statuses of the transmission network elements, a central supervisor in each system area for managing the transmission network elements based on supervisory data transmitted from the supervisors, respectively, and an extensive supervisor connected between the supervisors and the central supervisor in each system area, said method comprising the steps of:

(a) collecting the supervisory data from the supervisors by the extensive supervisors;

(b) transmitting the supervisory data collected in step (a) from the extensive supervisor to the central supervisor; and (c) transmitting the supervisory data to the extensive supervisor of an adjacent one of the other system zones.

5. A method of supervising a plurality of transmission network elements with a centralized supervisory system comprising a plurality of supervisors for supervising the transmission network elements, respectively, and a central supervisor for supervising the supervisors, the central supervisor having a display unit, said method comprising the steps of:

(a) collecting, with the supervisors, current data indicative of current statuses of the transmission network elements, event data indicative of changes in the current statuses of the transmission network elements, and historical data indicative of statuses of the transmission network elements before the central supervisor is set up;

(b) transmitting the current data, event data, and historical data, collected in step (a), from the supervisors to the central supervisor;

(c) generating, with the central supervisor, a current table indicative of the statuses of the transmission network elements based on the current data, event data, and history data transmitted in step (b);

(d) displaying data of the current table on the display unit of the central supervisor; and (e) generating, with the central supervisor, history data including fault histories of the transmission network elements for managing fault data of the transmission network elements.

6. A method according to claim 5, further comprising the step of (f) transmitting the event data, received before the central supervisor is set up, as historical data from the supervisors to the central supervisor when the central supervisor is set up.

7. A method according to claim 5, further comprising the step of (f) setting, in the central supervisor, all data relative to the transmission network elements in said current table to unconfirmed statuses when the central supervisor is set up.

8. A method according to claim 5, further comprising the step of (f) refraining, in the central supervisor, from updating the current table when the data transmitted to the central supervisor are historical data.

9. A method according to claim 5, further comprising the steps of:

(f) comparing the current data transmitted to the central supervisor with the data of the current table, and (g) updating, in the central supervisor, only data in the current table which are different from the current data.

10. A method according to claim 5, further comprising the steps of:

(f) comparing the current data transmitted to the central supervisor with the data of the current table, and (g) generating, in the central supervisor, history data based on only the data in the current table which are different from said current data.

11. A method according to claim 5, further comprising the steps of:

(f) determining whether the history data contain identical fault data when the data transmitted from the supervisors to the central supervisor are historical data, and (g) generating new history data if the history data contain no identical fault data, in the central supervisor.

12. A method according to claim 5, further comprising the steps of:

(f) checking whether the history data contain the occurrence of a fault corresponding to the restoration from a fault when the data from the supervisors indicate restoration from a fault, and (g) writing the time of the restoration from a fault in the history data, in the central supervisor.

13. A method according to claim 5, wherein the history data comprise data representative of at least an attribute of each fault of each of the transmission network elements, a name of each fault, a time of occurrence of each fault, and a time of restoration from each fault.

* * * * *